(12) United States Patent
Luo et al.

(10) Patent No.: US 12,058,688 B2
(45) Date of Patent: Aug. 6, 2024

(54) UPLINK SENSING WITH MULTIPLE BEAMS IN A SHARED SPECTRUM

(71) Applicant: QUALCOMM Incorporated, San Diego, CA (US)

(72) Inventors: Jianghong Luo, Skillman, NJ (US); Navid Abedini, Basking Ridge, NJ (US); Jing Sun, San Diego, CA (US); Tac Luo, San Diego, CA (US); Xiaoxia Zhang, San Diego, CA (US); Junyi Li, Fairless Hills, PA (US); Luca Blessent, Whitehouse Station, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 17/371,097

(22) Filed: Jul. 8, 2021

(65) Prior Publication Data

US 2022/0022246 A1    Jan. 20, 2022

Related U.S. Application Data

(60) Provisional application No. 63/052,436, filed on Jul. 15, 2020.

(51) Int. Cl.
*H04W 72/23* (2023.01)
*H04W 16/28* (2009.01)
*H04W 72/044* (2023.01)

(52) U.S. Cl.
CPC ........... *H04W 72/23* (2023.01); *H04W 16/28* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 2013/0258885 A1* | 10/2013 | Yu | H04B 7/0632 370/252 |
| 2018/0220448 A1 | 8/2018 | Akkarakaran et al. | |
| 2018/0234959 A1* | 8/2018 | Ahn | H04W 72/20 |
| 2018/0242300 A1* | 8/2018 | Hakola | H04L 5/0048 |
| 2019/0104542 A1 | 4/2019 | Chendamarai Kannan et al. | |
| 2019/0394822 A1 | 12/2019 | Hosseini et al. | |
| 2020/0029351 A1* | 1/2020 | Xiang | H04L 5/0091 |

(Continued)

OTHER PUBLICATIONS

U.S. Appl. No. 62/900,163 (Year: 2019).*

(Continued)

*Primary Examiner* — Joseph E Avellino
*Assistant Examiner* — Charles E Eckholdt
(74) *Attorney, Agent, or Firm* — QUALCOMM Incorporated

(57) ABSTRACT

Methods, systems, and devices for wireless communications are described. A wireless node may receive a grant of a set of resources for an uplink transmission from another wireless node. The wireless node may identify a plurality of beams for performing channel access for the uplink transmission based on receiving the grant. The wireless node may perform channel access procedures over at least a subset of beams of the plurality of beams. The wireless node may transmit over one or more beams of the subset of beams based on successful completion of one or more of the channel access procedures.

30 Claims, 21 Drawing Sheets

(56) References Cited

U.S. PATENT DOCUMENTS

2021/0013954 A1\* 1/2021 Zhao .................... H04L 5/0023
2021/0084683 A1\* 3/2021 Li .................... H04W 74/0808

OTHER PUBLICATIONS

U.S. Appl. No. 62/932,166 (Year: 2019).\*
International Search Report and Written Opinion—PCT/US2021/041186—ISA/EPO—Nov. 4, 2021.

\* cited by examiner

First Grant 215

Second Grant 220

UPLINK SENSING WITH MULTIPLE BEAMS IN A SHARED SPECTRUM

CROSS REFERENCE

The present application for patent claims the benefit of U.S. Provisional Patent Application No. 63/052,436 by Luo et al., entitled "UPLINK SENSING WITH MULTIPLE BEAMS IN A SHARED SPECTRUM," filed Jul. 15, 2020, assigned to the assignee hereof, and expressly incorporated by reference herein.

FIELD OF TECHNOLOGY

The following relates to wireless communications, including uplink sensing with multiple beams in a shared spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support communicating information between base stations and UEs in a shared spectrum. In addition, higher frequencies may be used for communication using transmissions over beams. However, channel access for shared spectrum may present challenges for communication over beams.

SUMMARY

The present disclosure relates to methods, systems, devices, and apparatuses that support uplink sensing with multiple beams in a shared spectrum. Generally, the described techniques provide for performing channel access procedures for an uplink transmission based on a grant. In one aspect, a wireless node may receive a grant of a set of resources for an uplink transmission. In an aspect, the wireless node may identify a plurality of beams for performing channel access for the uplink transmission based on receiving the grant. The wireless node may perform channel access procedures over a subset of beams of the plurality of beams. The wireless node may transmit over one or more beams of the subset of beams based on successful completion of one or more of the channel access procedures.

A method of wireless communication at a wireless node is described. The method may include receiving a grant of a set of resources for an uplink transmission, the grant indicating a plurality of beams for performing channel access for the uplink transmission, performing channel access procedures over at least a subset of beams of the set of beams, and transmitting over one or more beams of the subset of beams based on successful completion of one or more of the channel access procedures.

An apparatus for wireless communication at a wireless node is described. The apparatus may include a processor, memory coupled with the processor, and instructions stored in the memory. The instructions may be executable by the processor to cause the apparatus to receive a grant of a set of resources for an uplink transmission, the grant indicating a plurality of beams for performing channel access for the uplink transmission, perform channel access procedures over at least a subset of beams of the set of beams, and transmit over one or more beams of the subset of beams based on successful completion of one or more of the channel access procedures.

Another apparatus for wireless communication at a wireless node is described. The apparatus may include means for receiving a grant of a set of resources for an uplink transmission, the grant indicating a plurality of beams for performing channel access for the uplink transmission, performing channel access procedures over at least a subset of beams of the set of beams, and transmitting over one or more beams of the subset of beams based on successful completion of one or more of the channel access procedures.

A non-transitory computer-readable medium storing code for wireless communication at a wireless node is described. The code may include instructions executable by a processor to receive a grant of a set of resources for an uplink transmission, the grant indicating a plurality of beams for performing channel access for the uplink transmission, perform channel access procedures over at least a subset of beams of the set of beams, and transmit over one or more beams of the subset of beams based on successful completion of one or more of the channel access procedures.

In some aspects of the method, apparatuses, and non-transitory computer-readable medium described herein, receiving the grant may include operations, features, means, or instructions for receiving a single grant including an indication of the set of beams for performing the channel access for the uplink transmission.

In some aspects of the method, apparatuses, and non-transitory computer-readable medium described herein, receiving the grant may include operations, features, means, or instructions for receiving a first grant including an indication of a first subset of beams of the set of beams, receiving a second grant including an indication of a second subset of beams of the set of beams—and where identifying the set of beams for performing the channel access may be based on the receiving the first grant and receiving the second grant.

Some aspects of the method, apparatuses, and non-transitory computer-readable medium described herein may further include operations, features, means, or instructions for determining energy levels of beams of the subset of beams associated with the successfully completed one or more channel access procedures, and selecting the one or more beams of the subset of beams based on the determined energy levels of the beams of the subset of beams associated with the successfully completed one or more channel access procedures.

In some aspects of the method, apparatuses, and non-transitory computer-readable medium described herein, selecting the one or more beams of the subset of beams may include operations, features, means, or instructions for selecting a beam of the subset of beams based on determining the energy level of the beam satisfies a threshold—and where transmitting over the one or more beams of the subset of beams includes transmitting over the beam.

In some aspects of the method, apparatuses, and non-transitory computer-readable medium described herein, selecting the one or more beams of the subset of beams may include operations, features, means, or instructions for selecting two or more beams of the subset of beams based at least in part determining the respective energy levels of the two or more beams satisfy a threshold—and where transmitting over the one or more beams of the subset of beams includes transmitting over the two or more beams.

In some aspects of the method, apparatuses, and non-transitory computer-readable medium described herein, selecting the one or more beams of the subset of beams may include operations, features, means, or instructions for selecting a predetermined quantity of beams of the subset of beams based on determining the respective energy levels of the predetermined quantity of beams may have a lowest energy level among the beams of the subset of beams associated with the successfully completed one or more channel access procedures—and where transmitting over the one or more beams of the subset of beams includes transmitting over the predetermined quantity of beams.

In some aspects of the method, apparatuses, and non-transitory computer-readable medium described herein, receiving the grant may include operations, features, means, or instructions for receiving an indication of a maximum quantity of beams over which the wireless node may be permitted to transmit—and where transmitting over the one or more beams of the subset of beams may be based on receiving the indication of the quantity of beams.

Some aspects of the method, apparatuses, and non-transitory computer-readable medium described herein may further include operations, features, means, or instructions for transmitting a message including an indication of a capability of the wireless node associated with the channel access procedures—and where identifying the set of beams for performing the channel access for the uplink transmission, performing the channel access procedures over at least the subset of beams, or both, may be based on the capability.

In some aspects of the method, apparatuses, and non-transitory computer-readable medium described herein, receiving the grant of the set of resources for the uplink transmission may include operations, features, means, or instructions for receiving one or more resource allocations for the uplink transmission, where each of the one or more resource allocations for the uplink transmission may be associated with a beam of the subset of beams over which the channel access procedures may be performed—and where transmitting over the one or more beams of the subset of beams based on successful completion of one or more of the channel access procedures includes determining the one or more resource allocations for the uplink transmission based on successful completion of the one or more of the channel access procedures over the subset of beams over which the channel access procedures may be performed.

In some aspects of the method, apparatuses, and non-transitory computer-readable medium described herein, a first resource allocation for a first uplink transmission, where the first resource allocation may be associated with a first subset of beams of the subset of beams over which the channel access procedures may be performed and a first subset of resources, a second resource allocation for a second uplink transmission, where the second resource allocation may be associated with a second subset of beams of the subset of beams over which the channel access procedures may be performed and a second subset of resources—and where the first subset of resources may be fully-overlapping, at least partially overlapping, or non-overlapping with the second subset of resources.

In some aspects of the method, apparatuses, and non-transitory computer-readable medium described herein, performing the channel access procedures over at least the subset of beams of the set of beams may include operations, features, means, or instructions for performing a first channel access procedure over a first beam of the subset of beams over a first time period, and performing a second channel access procedure over a second beam of the subset of beams over the first time period or a second time period.

Some aspects of the method, apparatuses, and non-transitory computer-readable medium described herein may further include operations, features, means, or instructions for determining that a first channel access procedure over a first beam of the subset of beams may be successful, and terminating the channel access procedures over remaining beams of the set of beams based on transmitting over the one or more beams of the subset of beams.

Some aspects of the method, apparatuses, and non-transitory computer-readable medium described herein may further include operations, features, means, or instructions for determining that a first channel access procedure over a first beam of the subset of beams may be successful, and continuing to perform the channel access procedures of the first type for remaining beams of the subset of beams.

Some aspects of the method, apparatuses, and non-transitory computer-readable medium described herein may further include operations, features, means, or instructions for determining that a first quantity of the channel access procedures may be successful, and transmitting over a second quantity of the subset of beams based on respective energy levels of the subset of beams.

Some aspects of the method, apparatuses, and non-transitory computer-readable medium described herein may further include operations, features, means, or instructions for determining that a first channel access procedure over a first beam of the subset of beams may be successful, and switching a type of the channel access procedures for remaining beams of the subset of beams to a second type channel access procedure based on the determining that the first channel access procedure may be successful.

Some aspects of the method, apparatuses, and non-transitory computer-readable medium described herein may further include operations, features, means, or instructions for determining that a first quantity of the channel access procedures for the first beam and the remaining beams may be successful, and transmitting over a second quantity of the subset of beams based on respective energy levels of the subset of beams, a beam correspondence between the remaining beams and the first beam, a transmit power for the remaining beams, or a combination thereof.

Some aspects of the method, apparatuses, and non-transitory computer-readable medium described herein may further include operations, features, means, or instructions for inserting a filler signal based on the successful completion of one or more of the channel access procedures—and where transmitting over the one or more beams of the subset of beams may be based on inserting the filler signal.

In some aspects of the method, apparatuses, and non-transitory computer-readable medium described herein, inserting the filler signal may include operations, features, means, or instructions for inserting an extended cyclic prefix based on the successful completion of one or more of the channel access procedures—and where transmitting over the one or more beams of the subset of beams may be based on inserting the extended cyclic prefix.

In some aspects of the method, apparatuses, and non-transitory computer-readable medium described herein, receiving the grant may include operations, features, means, or instructions for receiving a downlink control information (DCI) message including an indication of the set of beams for performing the channel access for the uplink transmission.

Some aspects of the method, apparatuses, and non-transitory computer-readable medium described herein may further include operations, features, means, or instructions for receiving a medium access control (MAC) control element (MAC-CE) including an indication of the set of beams for performing the channel access for the uplink transmission.

Some aspects of the method, apparatuses, and non-transitory computer-readable medium described herein may further include operations, features, means, or instructions for receiving a radio resource control (RRC) message including an indication of the set of beams for performing the channel access for the uplink transmission.

In some aspects of the method, apparatuses, and non-transitory computer-readable medium described herein, receiving the grant may include operations, features, means, or instructions for receiving a downlink control information (DCI) message, a medium access control (MAC) control element (MAC-CE) including an indication of the set of beams for performing the channel access for the uplink transmission.

In some aspects of the method, apparatuses, and non-transitory computer-readable medium described herein, the wireless node includes a UE in an access network or a mobile terminal (MT) entity of an integrated access and backhaul (IAB) node in a IAB network.

A method of wireless communication at a wireless node is described. The method may include configuring a set of beams for performing channel access for another wireless node for uplink transmissions, transmitting a grant of a set of sets of resources for uplink transmissions to the other wireless node, each of the set of sets of resources associated with one or more beams of the set of beams, and receiving an uplink transmission from the other wireless node over at least one beam of the set of beams and over at least one set of resources of the set of sets of resources.

An apparatus for wireless communication at a wireless node is described. The apparatus may include a processor, memory coupled with the processor, and instructions stored in the memory. The instructions may be executable by the processor to cause the apparatus to configure a set of beams for performing channel access for another wireless node for uplink transmissions, transmit a grant of a set of sets of resources for uplink transmissions to the other wireless node, each of the set of sets of resources associated with one or more beams of the set of beams, and receive an uplink transmission from the other wireless node over at least one beam of the set of beams and over at least one set of resources of the set of sets of resources.

Another apparatus for wireless communication at a wireless node is described. The apparatus may include means for configuring a set of beams for performing channel access for another wireless node for uplink transmissions, transmitting a grant of a set of sets of resources for uplink transmissions to the other wireless node, each of the set of sets of resources associated with one or more beams of the set of beams, and receiving an uplink transmission from the other wireless node over at least one beam of the set of beams and over at least one set of resources of the set of sets of resources.

A non-transitory computer-readable medium storing code for wireless communication at a wireless node is described. The code may include instructions executable by a processor to configure a set of beams for performing channel access for another wireless node for uplink transmissions, transmit a grant of a set of sets of resources for uplink transmissions to the other wireless node, each of the set of sets of resources associated with one or more beams of the set of beams, and receive an uplink transmission from the other wireless node over at least one beam of the set of beams and over at least one set of resources of the set of sets of resources.

In some aspects of the method, apparatuses, and non-transitory computer-readable medium described herein, transmitting the grant may include operations, features, means, or instructions for transmitting a single grant including an indication of the set of beams.

In some aspects of the method, apparatuses, and non-transitory computer-readable medium described herein, transmitting the grant may include operations, features, means, or instructions for transmitting a first grant including an indication of a first beam of the set of beams, and transmitting a second grant including an indication of a second beam of the set of beams.

In some aspects of the method, apparatuses, and non-transitory computer-readable medium described herein, transmitting the grant may include operations, features, means, or instructions for transmitting an indication of a maximum quantity of beams over which the other wireless node may be permitted to transmit—and where receiving over at least one beam of the subset of beams may be based on transmitting the indication of the quantity of beams.

Some aspects of the method, apparatuses, and non-transitory computer-readable medium described herein may further include operations, features, means, or instructions for receiving a message including an indication of a capability of the other wireless node associated with channel access procedures—and where configuring the set of beams, transmitting the grant of the set of sets of resources, receiving over the one or more beams, or a combination thereof, may be based may be based on the capability.

In some aspects of the method, apparatuses, and non-transitory computer-readable medium described herein, transmitting the grant may include operations, features, means, or instructions for transmitting one or more resource allocations for the uplink transmission, where each of the one or more resource allocations for the uplink transmission may be associated with a beam of the subset of beams over which channel access procedures may be performed by the other wireless node—and where receiving over the one or more beams may be based on the one or more resource allocations.

In some aspects of the method, apparatuses, and non-transitory computer-readable medium described herein, a first resource allocation for a first uplink transmission, where the first resource allocation may be associated with a first subset of beams of the subset of beams over which the channel access procedures may be performed by the other wireless node and a first subset of resources, a second resource allocation for a second uplink transmission, where the second resource allocation may be associated with a second subset of beams of the subset of beams over which the channel access procedures may be performed by the other wireless node and a second subset of resources—and where the first subset of resources may be fully-overlapping, at least partially overlapping, or non-overlapping with the second subset of resources.

In some aspects of the method, apparatuses, and non-transitory computer-readable medium described herein, transmitting the grant may include operations, features, means, or instructions for transmitting an indication for inserting a filler signal based on the successful completion of one or more of the channel access procedures—and where receiving over the at least one beam may be based on an insertion of the filler signal by the other wireless node.

In some aspects of the method, apparatuses, and non-transitory computer-readable medium described herein, transmitting the indication for inserting the filler signal may include operations, features, means, or instructions for transmitting an indication for inserting an extended cyclic prefix based on the successful completion of one or more of the channel access procedures—and where receiving over the at least one beam may be based on an insertion of the extended cyclic prefix by the other wireless node.

Some aspects of the method, apparatuses, and non-transitory computer-readable medium described herein may further include operations, features, means, or instructions for monitoring the set of sets of resources, and where receiving over the one or more beams of the set of beams may be based on monitoring the set of sets of resources.

In some aspects of the method, apparatuses, and non-transitory computer-readable medium described herein, transmitting the grant may include operations, features, means, or instructions for transmitting a DCI message including an indication of the set of beams for performing the channel access for the uplink transmission.

Some aspects of the method, apparatuses, and non-transitory computer-readable medium described herein may further include operations, features, means, or instructions for transmitting a MAC-CE including an indication of the set of beams for performing the channel access for the uplink transmission.

Some aspects of the method, apparatuses, and non-transitory computer-readable medium described herein may further include operations, features, means, or instructions for transmitting a RRC message including an indication of the set of beams for performing the channel access for the uplink transmission.

In some aspects of the method, apparatuses, and non-transitory computer-readable medium described herein, transmitting the grant may include operations, features, means, or instructions for transmitting a downlink control information (DCI) message, a medium access control (MAC) control element (MAC-CE) including an indication of the set of beams for performing the channel access for the uplink transmission.

In some aspects of the method, apparatuses, and non-transitory computer-readable medium described herein, the wireless node includes a base station in an access network, a distributed node (DU) of an IAB node in a IAB network, or a central unit (CU) of an IAB donor node in the IAB network.

DETAILED DESCRIPTION

Figure 1:
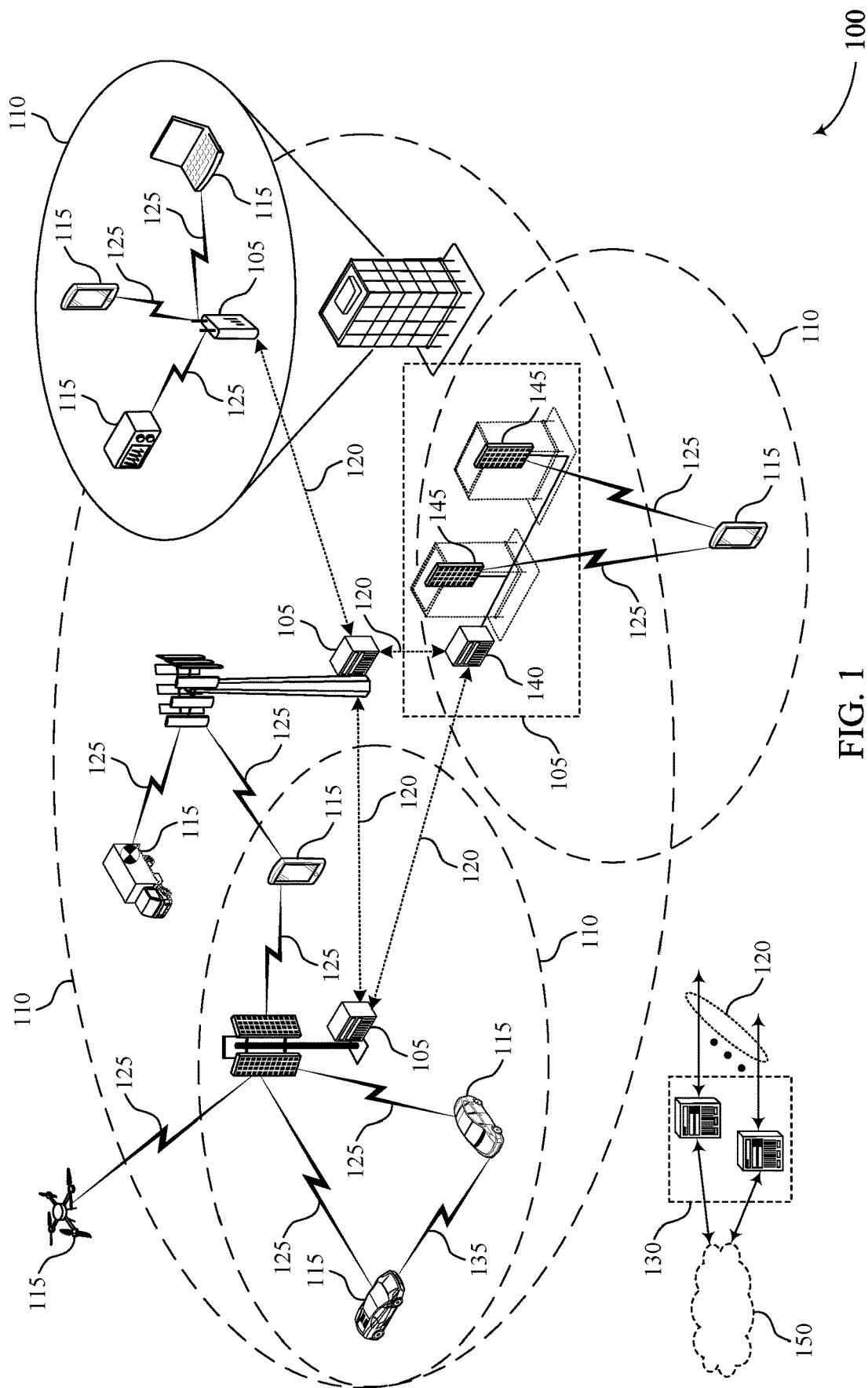
FIG. 1 illustrates an example of a wireless communications system that supports uplink sensing with multiple beams in a shared spectrum in accordance with aspects of the present disclosure.

Some wireless communications systems may support communicating information between base stations and at least one user equipment (UE) over beams in a shared spectrum. In some cases, a UE may support channel access procedures (e.g., type 1, type 2) prior to communicating with a base station over a channel. The UE may determine channel accessibility by sensing the channel according to a beam sensing direction indicated in a grant from the base station. The beam sensing direction may correspond to a resource allocation in the shared spectrum. In some cases, the base station may indicate a set of available beams to the UE via the grant, and the UE may perform channel access procedures based on the set of available beams. Enhancements for indicating beam sensing directions in a grant and performing channel access procedures based on the grant are described.

According to various aspects, a UE may support efficient techniques for performing channel access procedures based on a grant. In particular, a UE may receive a grant of a set of resources for an uplink transmission. The UE may identify a set of beams for performing channel access for the uplink transmission based on the grant. In some aspects, the UE may perform channel access procedures over at least a subset of beams of the set of beams. The UE may transmit over one or more beams of the subset of beams based on successful completion of one or more of the channel access procedures. In some cases, the UE may receive a single grant indicating a set of beam directions for performing channel access (e.g., sensing the channel) for the uplink transmission. In some cases, the UE may receive multiple grants, each grant indicating a beam direction for performing channel access.

According to some aspects, the UE may determine an energy level of at least one beam of the subset of beams based on performing the channel access procedures. In some aspects, the UE may select a beam of the subset of beams based on determining that the energy level of the beam satisfies a threshold. In some other aspects, the UE may select two or more beams of the subset of beams based on determining the respective energy levels of the beams satisfy the threshold. The UE may transmit over a single beam or multiple beams based on the beam selection.

In some aspects, the UE may receive an indication of a capability of a base station associated with receiving the set of beams. The UE may transmit over the one or more beams of the subset of beams based on receiving the indication of the capability. In another aspect, the UE may transmit a message including an indication of a capability of the UE associated with the channel access procedures. The UE may identify the set of beams for performing the channel access for the uplink transmission, and may perform the channel access procedures over at least the subset of beams based on the capability.

Multiple resource allocations may be indicated in the grant (or grants) from the base station, and each resource allocation may be associated with a respective subset of beams. The UE may receive one or more resource allocations for the uplink transmission, where each of the one or more resource allocations for the uplink transmission may be associated with a beam of the subset of beams over which the channel access procedures are performed. The subsets of resources may be fully-overlapping, at least partially overlapping, or non-overlapping.

The UE may perform channel access procedures over multiple beam directions simultaneously or over separate time periods (e.g., in a time division multiplexing manner) based on capability of the UE. In some other aspects, the UE may perform a channel access procedure over a first beam of the subset of beams based on a first channel access type (e.g., Type1 procedure). The UE may perform channel access procedures over a set of remaining beams of the subset of beams based on the first channel access type, a second channel access type (e.g., Type2 procedure), or both, based on successful completion of the channel access procedure over the first beam. In some aspects, the UE may insert a filler signal (e.g., an extended cyclic prefix) based on the successful completion of one or more of the channel access procedures. The UE may receive a grant or grants in a system information block (SIB), a master information block (MIB), radio resource control (RRC) signaling, or downlink control information (DCI). Using these techniques, a UE may perform channel access procedures with improved efficiency and reduced overhead.

The base stations and UEs may include aspects of wireless nodes communicating information over beams in the shared spectrum. In some aspects, a wireless node in the wireless communications systems described herein may be a UE in an access network or a mobile terminal (MT) entity of an integrated access and backhaul (IAB) node in a IAB network. In some aspects, another wireless node in the wireless communications systems described herein may be a base station in the access network, a distributed node (DU) of an IAB node in the IAB network, or a central unit (CU) of an IAB donor node in the IAB network.

Aspects of the disclosure are initially described in the context of a wireless communications system. Examples of processes and signaling exchanges that support uplink sensing with multiple beams in a shared spectrum are then described. Aspects of the disclosure are further illustrated by and described with reference to apparatus diagrams, system diagrams, and flowcharts that relate to uplink sensing with multiple beams in a shared spectrum.

FIG. 1 illustrates an example of a wireless communications system 100 that supports uplink sensing with multiple beams in a shared spectrum in accordance with aspects of the present disclosure. The wireless communications system 100 may include one or more base stations 105, one or more UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some aspects, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In other aspects, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some aspects, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some aspects, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some aspects, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signalto-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more of the UEs 115 may be configured for different types of channel access procedures (also referred to as channel sensing procedures). The UEs 115 may be configured for channel access procedures such as a type1 channel access procedures (e.g., sensing a random number of slots N) or type2 channel access procedures (e.g., sensing a deterministic time period or number of slots N). Such UEs 115 may access a channel based on the channel access procedures. The UEs 115 may perform channel sensing procedures based on a grant from a base station 105.

According to some aspects, enhancements are described in which the grant may indicate multiple beams (beam directions) for performing the channel access procedures. As part of the channel access procedures, a UE 115 receiving the grant may measure an energy of channels associated with the beams and compare the measured energy to an energy detection (ED) threshold. The UE 115 may transmit uplink communications to the base station 105 over one or more beams based on successful completion of one or more of the channel access procedures.

The UE 115 and the base station 105 described herein may include aspects of wireless nodes communicating information over beams in the shared spectrum. In some aspects, a wireless node in the wireless communications systems described herein may be a UE 115 in an access network or a MT entity of an IAB node in a IAB network. In some aspects, another wireless node in the wireless communications systems described herein may be a base station 105 in the access network, a DU of an IAB node in the IAB network, or a CU of an IAB donor node in the IAB network.

Figure 2:
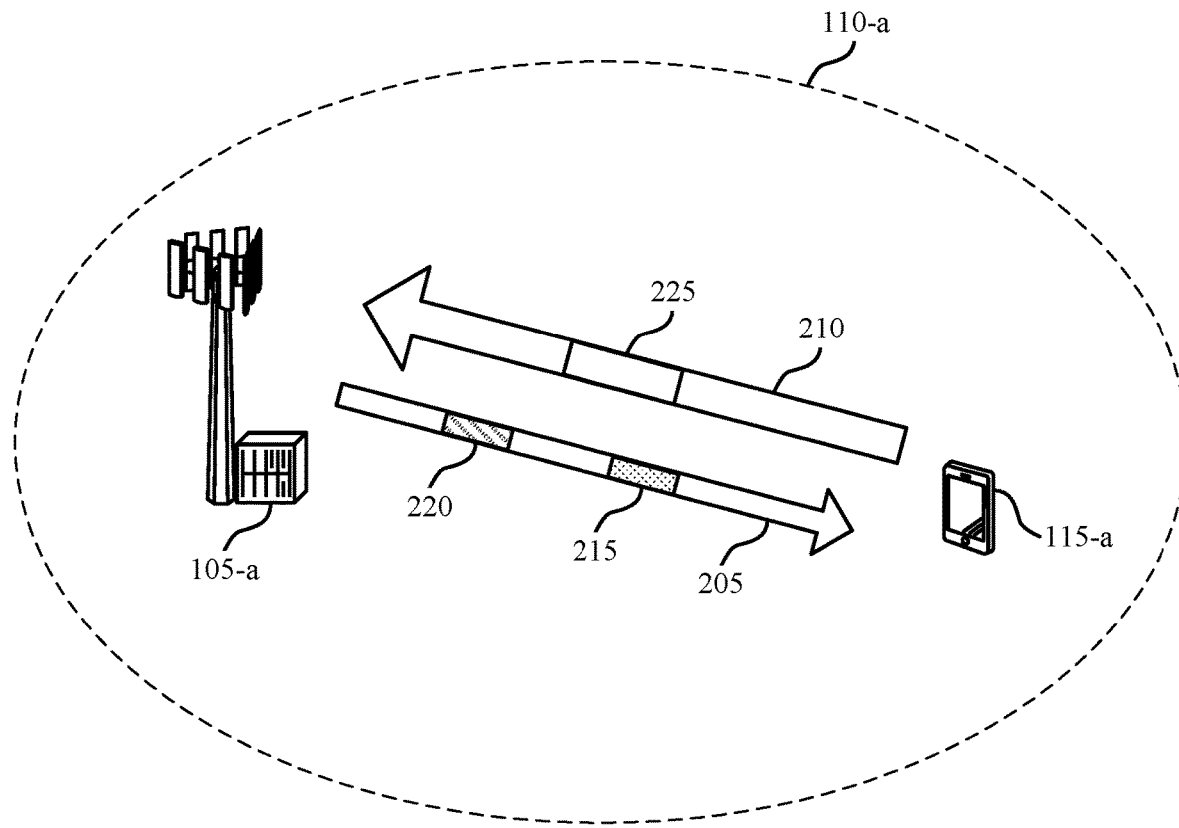
FIG. 2 illustrates an example of a wireless communications system that supports uplink sensing with multiple beams in a shared spectrum in accordance with aspects of the present disclosure.
Figure 2:
Figure 2:

FIG. 2 illustrates an example of a wireless communications system 200 that supports uplink sensing with multiple beams in a shared spectrum in accordance with aspects of the present disclosure. In some aspects, the wireless communications system 200 may implement aspects of wireless communications system 100 and may include a UE 115-*a* and a base station 105-*a*, which may be examples of a UE 115 and a base station 105, respectively, described with reference to FIG. 1. Base station 105-*a* and UE 115-*a* may communicate with one another within coverage area 110-*a* using downlink communications 205 and uplink communications 210 and using techniques described above with reference to FIG. 1. The wireless communications system 200 may provide signaling for indicating multiple sensing beam directions in a single grant or over multiple grants, which may thereby enhance system reliability and efficiency.

In the example of FIG. 2, the base station 105-*a* may transmit and the UE 115-*a* may receive a grant for an uplink transmission. The grant may indicate a set of resources for the uplink transmission. In an aspect, the base station 105-*a* may transmit and the UE 115-*a* may receive the grant using a SIB. In another aspect, the base station 105-*a* may transmit and the UE 115-*a* may receive the grant using a MIB. In some aspects, the base station 105-*a* may transmit and the UE 115-*a* may receive the grant using RRC signaling. In other aspects, the base station 105-*a* may transmit and the UE 115-*a* may receive the grant using DCI.

The base station 105-*a* may transmit and the UE 115-*a* may receive a single grant (e.g., first grant 215) including an indication of a set of beams (e.g., which may also be referred to as sensing beam directions) for performing the channel access for an uplink transmission 225. In another aspect, the base station 105-*a* may transmit and the UE 115-*a* may receive multiple grants indicating the set of beams, where each grant is associated with a different beam (e.g., a different sensing beam direction). In an aspect, the base station 105-*a* may transmit and the UE 115-*a* may receive a first grant 215 including an indication of a first beam (e.g., a first sensing beam direction) and a second grant 220 including an indication of a second beam (e.g., a second sensing beam direction).

In an aspect, the UE 115-*a* may determine transmit beam directions based on beams (e.g., sensing beam directions) indicated in the single grant (e.g., first grant 215). For instance, the UE 115-*a* may identify the beams (e.g., sensing beam directions) indicated in the first grant 215. In some aspects, the UE 115-*a* may determine transmit beam directions based on beams (e.g., sensing beam directions) indicated in the multiple grants (e.g., first grant 215 and second grant 220). For instance, UE 115-*a* may identify the beams (e.g., sensing beam directions) indicated in the first grant 215 and the second grant 220.

The UE 115-*a* may perform channel access procedures on a subset of the beams indicated in the grant (or grants). In some aspects, the UE 115-*a* may perform channel access procedures on all of the beams. In an aspect of the channel access procedures, the UE 115-*a* may measure an energy of channels associated with the subset of beams (or all of the beams) and compare the measured energy to an ED threshold. The UE 115 may transmit uplink communications 210 (e.g., uplink transmission 225) to the base station 105 over the beams based on successful completion of the channel access procedures. For example, the UE 115 may transmit uplink communications 210 (e.g., uplink transmission 225) to the base station 105 over a beam associated with a successfully completed channel access procedure (e.g., measured energy below the ED threshold). In some aspects, the UE 115 may transmit uplink communications 210 (e.g., uplink transmission 225) to the base station 105 over a set of beams respectively associated with successfully completed channel access procedures.

The UE 115-*a* may select a single beam (e.g., select a single beam direction) for transmitting the uplink communications 210 (e.g., uplink transmission 225). For instance, with reference to the channel access procedures, the UE 115-*a* may select a beam having a lowest energy level from a set of beams respectively associated with successfully completed channel access procedures (e.g., a set of beams having an energy level satisfying the ED threshold, a set of beams having an energy level below the ED threshold). Accordingly, the UE 115-*a* may transmit the uplink transmission 225 using the selected beam.

In some aspects, the UE 115-*a* may select the single beam by performing the channel access procedures serially on a subset of the beams indicated in the grant (or grants). In an aspect, the UE 115-*a* may perform the channel access procedures serially using a type2 channel access procedure sensing a deterministic number of sensing slots. In some aspects, the UE 115-*a* may select the single beam by selecting a first beam associated with a successfully completed channel access procedure. Accordingly, the UE 115-*a* may transmit using the first beam associated with a successfully completed channel access procedure.

In some other aspects, the UE 115-*a* may select the single beam by performing the channel access procedures in parallel (e.g., during a substantially simultaneous or overlapping time) on the subset of the beams indicated in the grant (or grants). In an aspect, the UE 115-*a* may perform the channel access procedures in parallel. With reference to the channel access procedures, the UE 115-*a* may select a beam having a lowest energy level from a set of beams respectively associated with successfully completed channel access procedures. Accordingly, the UE 115-*a* may transmit the uplink transmission 225 using the selected beam.

In some aspects, the UE 115-*a* may select two or more beams (e.g., select two or more beam directions) for transmitting the uplink communications 210 (e.g., uplink transmission 225). For instance, with reference to the channel access procedures, the UE 115-*a* may select multiple beams (e.g., two or more beams) having the lowest energy levels from a set of beams respectively associated with successfully completed channel access procedures (e.g., a set of beams having an energy level satisfying the ED threshold, a set of beams having an energy level below the ED threshold). Accordingly, the UE 115-*a* may transmit the uplink transmission 225 using the selected beams.

In some other aspects, the UE 115-*a* may select a predetermined quantity of beams for transmitting the uplink communications 210 (e.g., uplink transmission 225). For instance, with reference to the channel access procedures, the UE 115-*a* may select a predetermined quantity of beams (e.g., the top K beams, where K is an integer value greater than or equal to one, for example, an integer value of three) having the lowest energy levels from a set of beams respectively associated with successfully completed channel access procedures (e.g., having an energy level satisfying the ED threshold, in some aspects, an energy level below the ED threshold). Accordingly, the UE 115-*a* may transmit the uplink transmission 225 using the selected beams.

In other cases, the base station 105-*a* may transmit and the UE 115-*a* may receive an indication of a capability of the base station 105-*a* associated with receiving beams. In some cases, the UE 115-*a* may transmit and the base station 105-*a* may receive a message including an indication of a capability of the UE 115-*a* associated with channel access procedures. In some other cases, the base station 105-*a* may transmit and the UE 115-*a* may receive an indication of resource allocations associated a set of beams included in the grant (or grants). In some other cases, the base station 105-*a* may transmit and the UE 115-*a* may receive an indication of a quantity of beams (e.g., a maximum quantity of beams) over which the UE 115-*a* is permitted to transmit. In some aspects, the UE 115-*a* may transmit over the quantity of beams specified in the indication.

In some aspects, the methods described herein may be associated with one or more potential advantages. For instance, by receiving one or more grants (e.g., first grant 215, second grant 220) indicating a set of beams that UE 115-*a* is to sense, UE 115-*a* may select a beam of the set of beams that has a lowest channel energy level among the beams of the set of beams for which UE 115-*a* has successfully performed a channel access procedure. Using a beam associated with the lowest channel energy level may decrease the interference associated with a transmission transmitted over that beam as compared to other beams for which a channel access procedure was successfully performed. Decreased interference may increase the chance that base station 105-*a* successfully receives uplink transmission 225 from UE 115-*a*. Accordingly, the efficiency of wireless communications between UE 115-*a* and base station 105-*a* may increase according to the techniques described herein.

Figure 3:
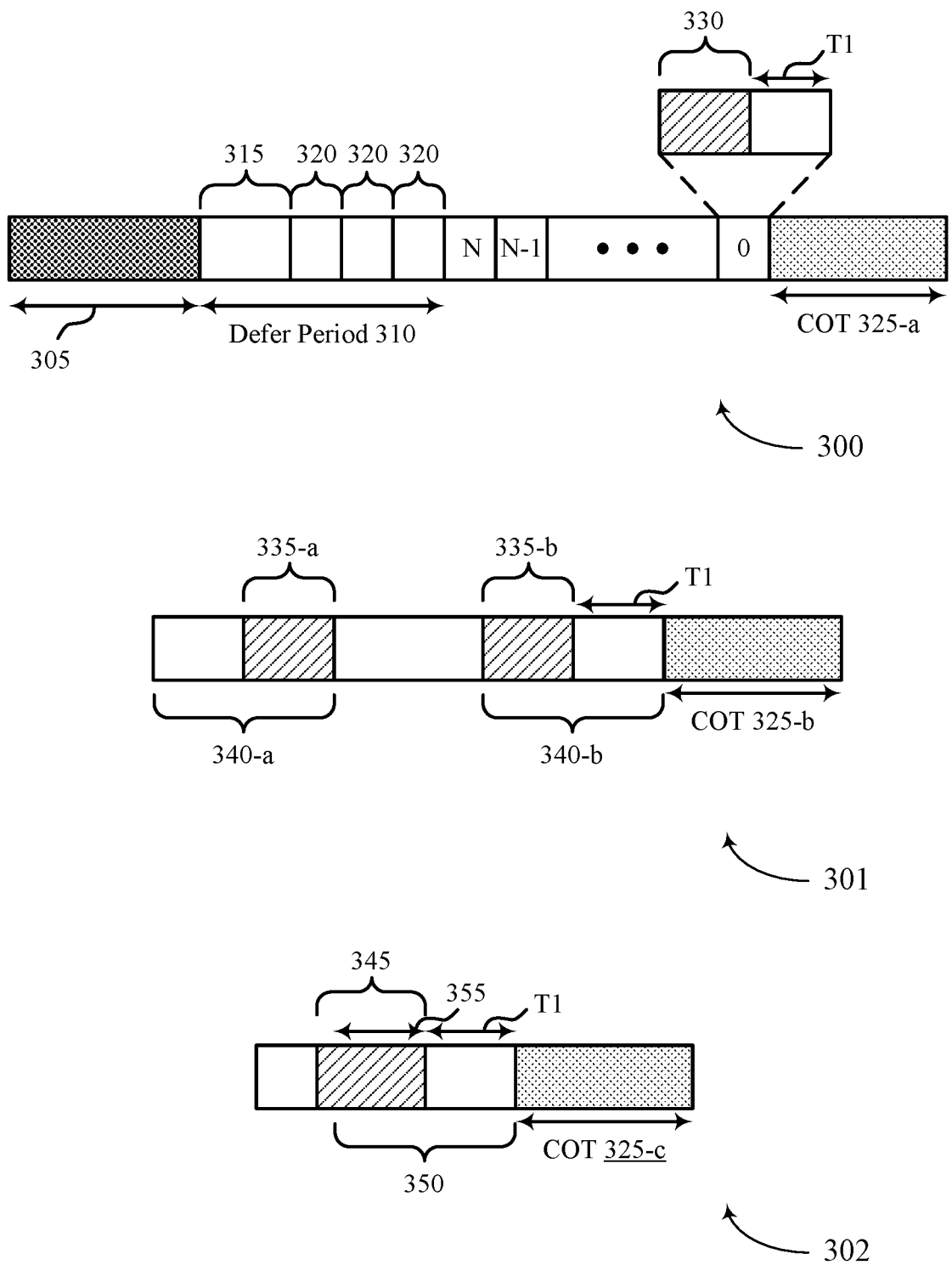
FIG. 3 illustrates examples of channel sensing configurations that support uplink sensing with multiple beams in a shared spectrum in accordance with aspects of the present disclosure.

FIG. 3 illustrates examples of channel sensing configurations 300, 301, and 302 that support channel sensing procedures in accordance with aspects of the present disclosure. In some aspects, the channel sensing configurations 300, 301, and 302 may be implemented by aspects of the wireless communications system 100 and the wireless communications system 200.

FIG. 3 illustrates aspects of techniques for channel sensing in a shared spectrum in some wireless communications systems. The channel sensing configurations 300, 301, and 302 illustrate example channel sensing configurations that a UE 115 may use to perform separate channel sensing procedures for transmissions. The channel sensing configuration 300 illustrates an example of a type1 channel sensing procedure that the UE 115 may implement to gain access and to initiate a channel occupancy time (COT) 325 (for example, in an NR-U shared spectrum). A type1 channel sensing procedure, which may be equivalently referred to as a type1 channel access procedure, may include a random number of slots N that the UE 115 may sense (for example, a random number of slots N during which the UE 115 may measure an energy of a channel). For example, the UE 115 may identify that a channel is busy during a time period 305 and may determine to perform the type1 channel sensing procedure upon the expiration of the time period 305 and one or more defer periods 310. A defer period 310 may include a slot 315 and a number of slots 320. The UE 115 may determine the number (the quantity) of slots 320 in the defer period 310 based on a parameter, such as an $m_p$ parameter. For example, the UE 115 may use the $m_p$ parameter to determine a number of slots 320 that may follow a slot 315. As illustrated in the channel sensing configuration 300, $m_p$ may be equal to 3 and, as such, three slots 320 may follow the slot 315. In some aspects, the slot 315 may span a time duration equal to 16 microseconds and a slot 320 may span a time duration equal to a basic sensing unit of time, which may be equal to 9 microseconds. As such, in aspects in which $m_p$ is equal to 3, the defer period 310 may span a time duration equal to 43 microseconds ($16+m_p*9=16+3*9=43$).

Upon expiration of the defer period 310, the UE 115 may sense a random number (which may be denoted as N, where N≥0) of sensing slots that are determined to be idle prior to transmitting. In some aspects, each of the sensing slots that the UE 115 may sense may include a measurement area 330. Each of the sensing slots may span a time duration equal to the basic sensing unit of time, which may be equal to 9 microseconds, and each measurement area 330 within a sensing slot may span a time duration of at least 4 microseconds. The UE 115 may maintain a counter initially set to N when performing a type1 channel sensing procedure and may reduce the counter by one for each sensing slot that the UE 115 senses to be idle. For example, the UE 115 may measure an energy of the channel during the measurement area 330 in a sensing slot and determine to reduce the counter by one if the measured energy satisfies an ED threshold (e.g., is below the ED threshold or equal to the ED threshold). In aspects in which the measured energy fails to satisfy the ED threshold, the UE 115 may determine that the sensing slot is busy and hold the counter at its existing value, wait another defer period 310 after the sensing slot that was determined to be busy, and continue the channel sensing procedure in sensing slots after the defer period 310. In such aspects, the UE 115 may continue reducing the counter by one for each sensing slot that is measured to be idle and waiting other defer periods 310 if other sensing slots are determined to be busy before the counter reaches zero.

Once the counter at the UE 115 reaches zero, the UE 115 may have sensed a total of N sensing slots to be idle and, in some aspects, completed the type1 channel sensing procedure and may transmit at the next scheduled or allocated transmission occasion. In aspects in which the counter reaches zero before the next scheduled or allocated transmission occasion (for example, if there is a time gap between the $N^{th}$ idle sensing slot and the next scheduled or allocated transmission occasion), the behavior of the UE 115 may vary. In some aspects, the UE 115 may hold the counter value at zero and perform channel sensing in a sensing slot prior (such as immediately prior, so that the sensing slot is aligned with the beginning of the scheduled or allocated transmission occasion) to the next scheduled or allocated transmission occasion and may transmit at the scheduled or allocated occasion if the sensing slot is sensed to be idle. In some other aspects, the UE 115 may continue sensing the channel after the counter reaches zero and may decrease the value of the counter past zero (to negative values) for each idle slot sensed. In such aspects, the UE 115 may transmit at the scheduled or allocated occasion if the counter value is less than or equal to zero. If the UE 115 senses a slot to be busy when the counter is at zero, the UE 115 may restart the type1 channel sensing procedure (for example, with a newly generated random number N for the counter).

In aspects in which the UE 115 measures an energy of the channel that satisfies an ED threshold of a first channel sensing procedure in a total of N sensing slots (such that the counter is less than or equal to zero), the UE 115 may initiate a COT 325-*a* and transmit. In some aspects, a type1 channel sensing procedure may be used by the UE 115 or a base station 105 to initiate a COT 325-*a*. A duration of the COT 325-*a* initiated for transmissions of the UE 115 may be less than or equal to a maximum COT associated with the priority class of the transmissions (the traffic) from the UE 115. The priority class may be equivalently referred to as a channel access priority class (CAPC), may be denoted by the symbol p, and may be described based on Table 1, shown below.

TABLE 1

| CAPC (p) | $m_p$ | $CW_{min, p}$ | $CW_{max, p}$ | $T_{mcot, p}$ | Allowed $CW_p$ Sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Table 1 shows aspects of various parameters that may be associated with the CAPC for a type1 channel sensing procedure for a downlink transmission or an uplink transmission. As shown by Table 1, the UE 115 may use different parameters based on the class of the traffic to determine the configuration of a type1 channel sensing procedure. For instance, the UE 115 may use the parameters $CW_{min,p}$ and $CW_{max,p}$ to determine a lower limit and an upper limit, respectively, of a contention window (CW) that the UE 115 may use for performing a type1 channel sensing procedure. The CW may include a list of values, as shown by the $CW_p$ Sizes column, from which the UE 115 may randomly select a value to set as the counter. For instance, the UE 115 may determine N based on randomly selecting (via a random number generator) a value from $CW_p$ Sizes. The UE 115 may use the parameter $T_{mcot,p}$ to determine a duration the UE 115 may hold a COT after passing the type1 channel sensing procedure.

The channel sensing configurations 301 and 302 illustrate aspects of type2 channel sensing procedures that a UE 115 may implement to gain access and to initiate a COT 325 (for example, in an NR-U shared spectrum). For example, the channel sensing configuration 301 may illustrate an example of a type2A channel sensing procedure, which may be equivalently referred to as a type2A channel access procedure, and the channel sensing configuration 302 may illustrate an example of a type2B channel sensing procedure, which may be equivalently referred to as a type2B channel access procedure. In some aspects, a type2 channel sensing procedure may be used by the UE 115 or a base station 105 to initiate a COT 325 for transmissions of discovery signals. Additionally, or alternatively, a type2 channel sensing procedure may be used by the UE 115 or a base station 105 to send transmissions after a time gap within a previously initiated COT 325 or a shared COT 325. In such aspects, the UE 115 or the base station 105 may perform a relatively lower-latency channel sensing procedure (as compared to a type1 channel sensing procedure) to access a channel within a previously initiated COT 325. The parameter ULtoDL-CO-SharingED-Threshold-r16 may indicate the upper limit ED threshold (the maximum ED threshold) that may be used to allow a UE-initiated COT to be shared with a base station 105. The parameter ULtoDL-CO-SharingED-Threshold-r16 may be configured by a base station 105 based on its transmission power (for example, its maximum transmission power).

A type2A channel sensing procedure, as illustrated in the channel sensing configuration 301, may enable the UE 115 to transmit signaling based on sensing a channel to be idle (e.g., based on determining that a measured energy satisfies an ED threshold) for a deterministic time period. For instance, the channel sensing configuration 301 may illustrate a channel sensing procedure having a duration of 25 microseconds. Such a channel sensing procedure may be used by the UE 115 in aspects in which a time gap between switching from downlink to uplink is greater than or equal to 25 microseconds and when a gap between switching from uplink to downlink is equal to 25 microseconds.

The channel sensing configuration 301 may use two sensing slots 340 including a sensing slot 340-*a* at the beginning of the channel sensing configuration 301 and a sensing slot 340-*b* at the end of the channel sensing configuration 301. Each sensing slot 340 may include a measurement area 335 during which the UE 115 may measure an energy of the channel. For instance, the sensing slot 340-*a* may include a measurement area 335-*a* and the sensing slot 340-*b* may include a measurement area 335-*b*, and the UE 115 may perform the type2A channel sensing procedure based on measuring an energy of the channel during the measurement area 335-*a* and during the measurement area 335-*b*. In cases in which the measured energy satisfies an ED threshold of a channel sensing procedure in both the measurement area 335-*a* and the measurement area 335-*b*, the UE 115 may determine that the channel is idle (e.g., available) and may initiate a COT 325-*b*. In some cases, the sensing slot 340-*a* and the sensing slot 340-*b* may span time durations equal to the basic sensing unit of time, which may be equal to 9 microseconds, and the measurement area 335-*a* and the measurement area 335-*b* may span time durations equal to 4 microseconds.

A type2B channel sensing procedure, as illustrated in the channel sensing configuration 302, may enable the UE 115 to transmit signaling based on sensing a channel to be idle (for example, based on determining that a measured energy satisfies an ED threshold) for a deterministic time period. For example, the channel sensing configuration 302 may illustrate a channel sensing procedure having a duration of 16 microseconds. Such a channel sensing procedure may be used by the UE 115 in cases in which a time gap between switching from downlink to uplink, switching from uplink to uplink, switching from uplink to downlink, or switching from downlink to downlink is equal to 16 microseconds.

The channel sensing configuration 302 may include one sensing slot 350 at the end of the channel sensing configuration 302 and a measurement area 345. In some aspects, the sensing slot 350 may include at least a first portion of the measurement area 345 equal to a time duration of 355, while a second portion of the measurement area 345 may, in some implementations, be outside of the sensing slot 350. For example, the sensing slot 350 may span a time duration equal to the basic sensing unit of time, which may be equal to 9 microseconds, and may include at least 4 microseconds of the measurement area 345 (for example, the time duration 355 may be greater than or equal to 4 microseconds). In some aspects, the measurement area 345 may span a time duration equal to 5 microseconds. The UE 115 may measure an energy of the channel during the measurement area 345 that is included within the sensing slot 350 based on performing the type2B channel sensing procedure and determine whether to initiate a COT 325-c based on whether the measured energy satisfies an ED threshold of a channel sensing procedure. In aspects in which the measured energy satisfies the ED threshold, the UE 115 may initiate the COT 325-c.

In some aspects, the UE 115 may perform a type2C channel sensing procedure, which may be equivalently referred to as a type2C channel access procedure, and may refrain from performing any channel sensing prior to transmitting any transmissions. The UE 115 may determine to perform a type2C channel sensing procedure in aspects in which a time gap between switching from downlink to uplink, switching from uplink to uplink, switching from uplink to downlink, or switching from downlink to downlink is less than or equal to 16 microseconds and the transmissions are less than a threshold time duration (for example, less than 584 microseconds).

In cases in which the UE 115 performs a type1, a type2A, or a type2B channel sensing procedure, the UE 115 may measure an energy of a channel in at least one sensing slot including a measurement area prior to transmitting. For instance, type1, type2A, and type2B channel sensing procedures may include different numbers of sensing slots or span different total durations, but the last sensing slot (e.g., the sensing slot latest in time or the sensing slot that is aligned with the COT 325) of each type of channel sensing procedure may be common across the three types of channel sensing procedures. For instance, the sensing slot that is aligned with the COT 325 for each type of channel sensing procedure may be a sensing slot of 9 microseconds and include at least four microseconds of a measurement area during which the UE 115 may sense the channel. Such final sensing slots that are common to the three types of channel sensing procedures also may include a time gap T1 between the measurement area of the sensing slot and the beginning of the COT 325. In some aspects, the time gap T1 may be a time gap to provide node processing time and may include sufficient time for the UE 115 to switch from sensing to transmitting. In some aspects, the UE 115 may determine a timing of the separate channel sensing procedures (which may include any combination of a type1, a type2A, or a type2B channel sensing procedure) based on the sensing capability of the UE 115.

Figure 4:
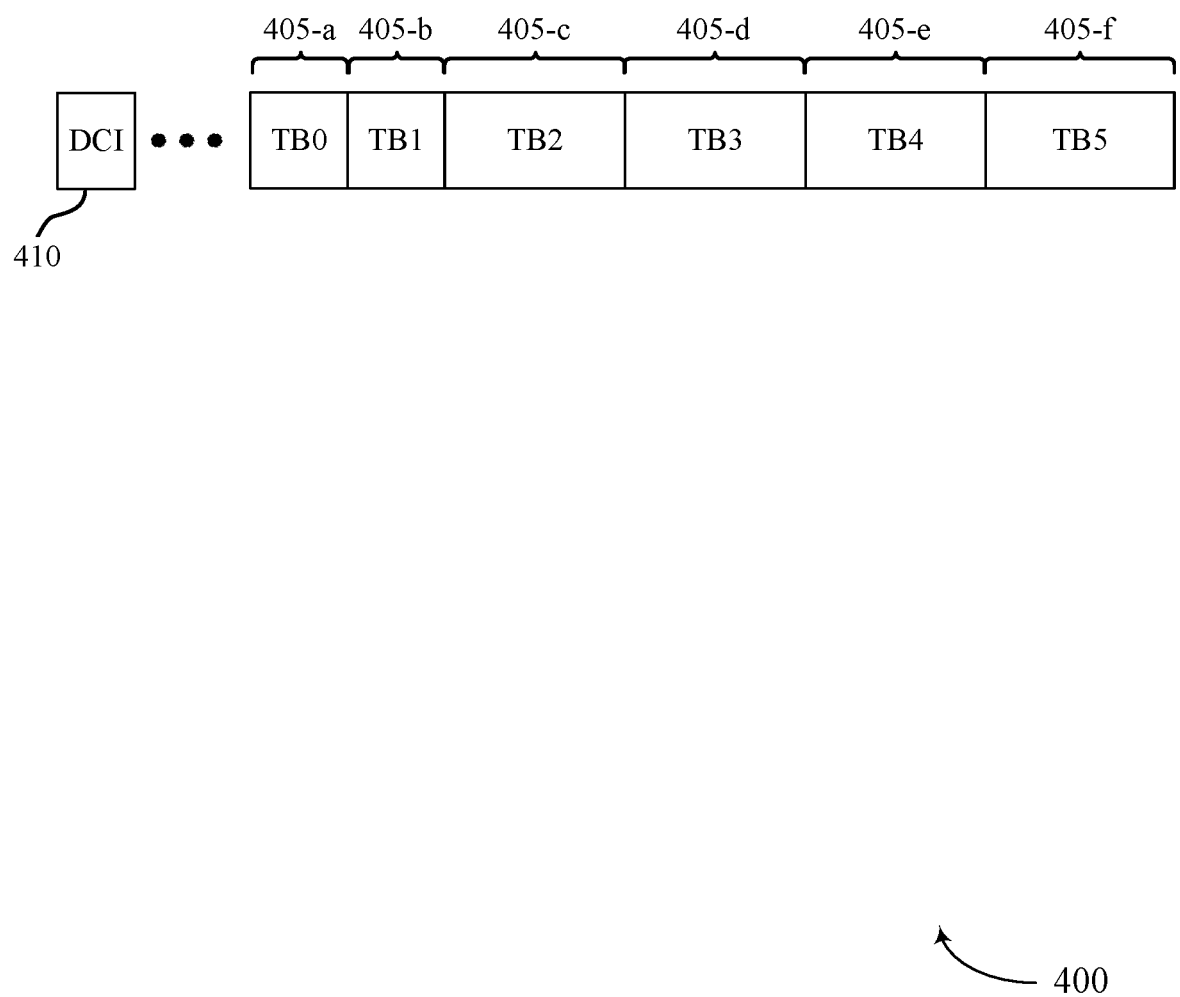
FIG. 4 illustrates an example of physical uplink shared channel (PUSCH) scheduling that supports uplink sensing with multiple beams in a shared spectrum in accordance with aspects of the present disclosure.

FIG. 4 illustrates an example of physical uplink shared channel (PUSCH) scheduling 400 in accordance with aspects of the present disclosure. In some aspects, the PUSCH scheduling 400 may be implemented by aspects of the wireless communications system 100 and the wireless communications system 200.

FIG. 4 illustrates aspects of techniques for PUSCH scheduling 400 in a shared spectrum in the wireless communications system 100 and the wireless communications system 200. The wireless communications system 100 and the wireless communications system 200 may support both single PUSCH and multi-PUSCH scheduling. In some aspects, a base station 105 may schedule multiple continuous PUSCHs (e.g., back-to-back PUSCHs 405) with separate transport blocks (TBs) over multiple slots or mini-slots (i.e., subframes). Each of the TBs may be mapped to at most one slot or one mini-slot. In some aspects, the PUSCHs 405 (and the corresponding TBs) may be the same or different in length.

In some wireless communications systems, PUSCHs 405 (e.g., PUSCH 405-a through 405-f) may be scheduled by the same DCI grant (e.g., DCI grant 410) transmitted by the base station 105. In some cases, the PUSCHs 405 granted by the DCI grant 410 may share some of the same parameters, but with different HARQ process identifiers, redundancy version identifiers (RVIDs), new data indicators (NDIs), and time-domain resource allocations. In some wireless communications systems, the PUSCHs 405 granted by the DCI grant 410 may be associated with a same transmit beam direction indicated in the DCI grant 410. In some cases, the base station 105 may indicate the beam direction via a scheduling request indicator (SRI) field of the DCI grant 410. In some wireless communications systems, the UE 115 may use the transmit beam direction indicated in the DCI grant 410 for channel sensing (e.g., clear channel assessment) in determining when to transmit.

According to aspects described herein, the base station 105 may transmit a grant (or grants) which includes scheduling information for the PUSCHs 405 (e.g., PUSCH 405-a through 405-f), without an indication of a specific beam direction for uplink transmission. That is, the grant (or grants) may provide a set of beams for channel sensing (e.g., candidate sensing directions), and the UE 115 may determine a beam direction (or directions) to be used for uplink transmissions from the set of beams based on channel sensing (e.g., clear channel assessment) of the set of beams. In some aspects, the base station 105 may transmit and the UE 115 may receive a single grant (or multiple grants) indicating a plurality of beams (also referred to herein as sensing beams or beam directions) for performing channel access for uplink transmissions. In some aspects, the base station 105 may indicate the plurality of beams over multiple grants. The UE 115 may perform channel access procedures over some or all of the plurality of beams. In some cases, the UE 115 may select and transmit over a set of beams of the plurality of beams based on successful completion of one or more of the channel access procedures.

Figure 5A:
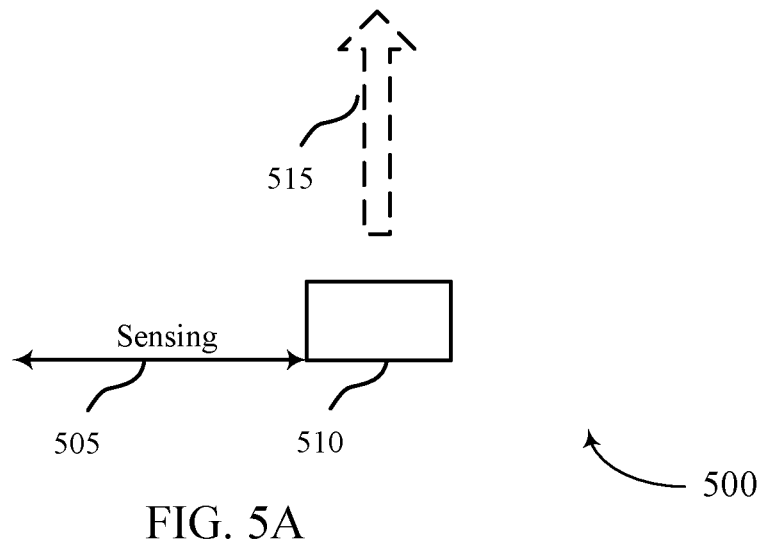
FIGS. 5A and 5B illustrate examples that support uplink sensing with multiple beams in a shared spectrum in accordance with aspects of the present disclosure.
Figure 5B:
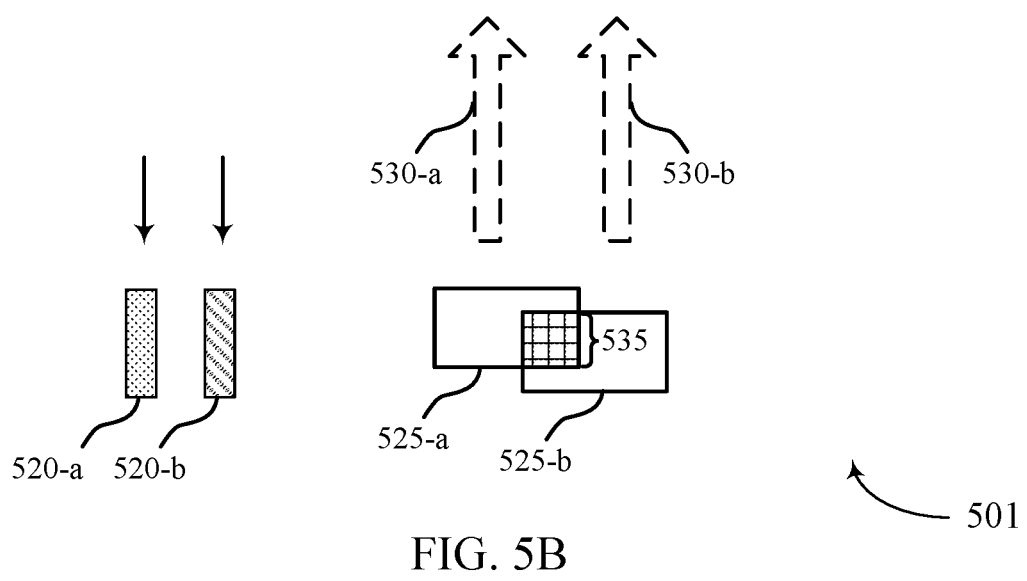

FIGS. 5A and 5B illustrate examples 500 and 501 that support uplink sensing with multiple beams in a shared spectrum in accordance with aspects of the present disclosure. In some aspects, the examples 500 and 501 may be implemented by aspects of the wireless communications system 100 and the wireless communications system 200. FIGS. 5A and 5B illustrate aspects of techniques for channel sensing in a shared spectrum in some wireless communications systems. The example 500 illustrates aspects of multiple beams (beam directions) indicated by the base station 105 to the UE 115 (e.g., the base station 105-a to the UE 115-*a*). The example 501 illustrates aspects of multiple resource allocations indicated by the base station 105-*a* to the UE 115-*a*.

Referring to FIG. 5A, the base station 105 may transmit and the UE 115 may receive a grant or grants (e.g., first grant 215, second grant 220 described with reference to FIG. 2) indicating a single resource allocation 510 (e.g., a single set of resources) and a plurality of beams. The UE 115 may perform channel access procedures (e.g., sensing 505 over the plurality of beams) and may select one or more beams (e.g., beam 515) of the plurality of beams based on successful completion of channel access procedures (e.g., sensing results). The UE 115 may transmit an uplink transmission over the resource allocation 510 based on successful completion of one or more of the channel access procedures.

In some aspects, the base station 105 may configure a number (quantity) of beam directions available for uplink transmissions by the UE 115 based on a capability of the UE 115 associated with performing channel access procedures. In some cases, the base station 105 may configure the resource allocation for the UE 115 based on the capability. In an aspect, a capability of the UE 115 may be that the UE 115 may support spatial division multiplexing transmissions (SDM-TX). That is, the UE 115 may support the selection of multiple beam directions for uplink transmissions based on channel access procedures. In some aspects, the base station 105 may receive a message from the UE 115 including an indication of the capability of the UE 115 (e.g., SDM-TX support) associated with performing channel access procedures. Accordingly, the base station 105 may indicate, in the grant, a single resource allocation and a plurality of beams associated with the resource allocation.

In another aspect, a capability of the UE 115 may be that the UE 115 does not support spatial division multiplexing transmissions (SDM-TX). In some aspects, the base station 105 may receive a message from the UE 115 including an indication of the capability of the UE 115 (e.g., no SDM-TX support) associated with performing channel access procedures. Accordingly, the base station 105 may indicate, in the grant, a single resource allocation and a single beam associated with the resource allocation.

Referring to FIG. 5B, the base station 105 may transmit and the UE 115-*a* may receive a grant (e.g., a DCI grant, an RRC configured grant) or grants (e.g., separate DCI grants) indicating multiple resource allocations 525 and a plurality of beams. In an aspect, the base station 105 may transmit and the UE 115 may receive a grant 520 indicating resource allocations 525-*a* and 525-*b* and a plurality of beams. In an aspect, the base station 105 may transmit and the UE 115 may receive the grant 520-*a* and a grant 520-*b*, in which the grant 520-*a* indicates the resource allocation 525-*a* and the grant 520-*b* indicates the resource allocation 525-*b*. In some aspects, the resource allocation 525-*a* may be associated with a beam 530-*a*, and the resource allocation 525-*b* may be associated with a beam 530-*b*.

The UE 115 may perform channel access procedures (e.g., sensing procedures) over the plurality of beams indicated in the grant (or grants). The UE 115 may select one or more beams (e.g., beam 530-*a*, beam 530-*b*, or both) of the plurality of beams based on successful completion of channel access procedures (e.g., sensing results) associated with the beams. In an aspect, the UE 115 may transmit an uplink transmission over the resource allocation 525-*a* using the beam 530-*a*, based on successful completion of the channel access procedure associated with the beam 530-*a*. In another aspect, the UE 115 may transmit an uplink transmission over the resource allocation 525-*b* using the beam 530-*b*, based on successful completion of the channel access procedure associated with the beam 530-*b*. In some aspects, the UE 115 may transmit uplink transmissions over the resource allocation 525-*a* and the resource allocation 525-*b* using the beam 530-*a* and the beam 530-*b*, respectively, based on successful completion of the channel access procedures associated with the beam 530-*a* and the beam 530-*b*.

In some aspects, the number (quantity) of resource allocations 525 which may be selected for uplink transmissions may be configured by the base station 105 or defined based on some criteria. In some cases, only one resource allocation 525 may be selected for uplink transmissions based on sensing results. In other cases, multiple resource allocations 525 (e.g., resource allocation 525-*a*, resource allocation 525-*b*) may be selected for uplink transmissions based on sensing results.

The allocated resources associated with uplink transmissions may be fully-overlapping or at least partially overlapping in the time domain and/or frequency domain. That is, the resource allocation 525-*a* and the resource allocation 525-*b* may include a set of overlapping resources 535. In another aspect, the allocated resources associated with uplink transmissions may be non-overlapping in the time domain and/or frequency domain.

In an aspect, because the UE 115 may select beam 530-*a*, beam 530-*b*, or both for uplink transmissions based on successful completion of channel access procedures (e.g., sensing results) associated with the beam 530-*a* and the beam 530-*b*, the base station 105 may be unaware of which of the beams have been selected by the UE 115. Accordingly, in the case in which the resource allocation 525-*a* and the resource allocation 525-*b* are fully-overlapping or at least partially overlapping in the time domain and/or frequency domain, the base station 105 may monitor both the resource allocation 525-*a* and the resource allocation 525-*b* in order to successfully receive uplink transmissions from the UE 115. In an aspect, the base station 105 may support spatial division multiplexing receiving (SDM-RX) (e.g., simultaneous receiving). That is, the base station 105 may support simultaneous reception of multiple beams (e.g., beams 530-*a* and 530-*b*), thereby supporting the overlapping resource allocations 525-*a* and 525-*b* respectively associated with the beams 530-*a* and 530-*b*.

In another aspect, the base station 105 may lack support for SDM-RX (e.g., simultaneous receiving). That is, the base station 105 may lack support for simultaneous reception of multiple beams (e.g., beams 530-*a* and 530-*b*). In such aspects, the base station 105 may still support the overlapping resource allocations 525-*a* and 525-*b* respectively associated with the beams 530-*a* and 530-*b*, based on a gap (e.g., duration) between a front-load demodulation reference signal (DMRS) of the resource allocation 525-*a* and a front-load DMRS of the resource allocation 525-*b*. In an aspect, in a case in which the front-load DMRS of the resource allocation 525-*a* (at the first symbol of resource allocation 525-*a*) is separated from the front-load DMRS of the resource allocation 525-*b* (at the first symbol of resource allocation 525-*b*) by a duration equal to at least the processing time of DMRS, the base station 105 may determine from the absence of the front-load DMRS of the resource allocation 525-*a* that the resource allocation 525-*a* is not used by the UE 115 for uplink transmission. Accordingly, the base station 105 may skip receiving (e.g., ignore) remaining symbols of the resource allocation 525-*a*, and receive the resource allocation 525-*b*. Conversely, if the front-load DMRS of the resource allocation 525-*a* is present, the base station 105 may receive the remaining symbols of the resource allocation 525-a, and suppress reception of the resource allocation 525-b.

Figure 6A:
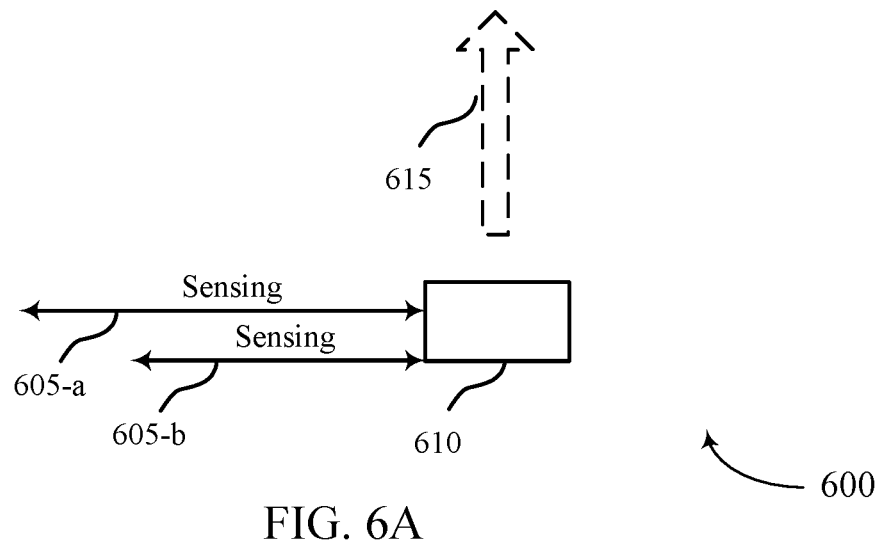
FIGS. 6A and 6B illustrate examples that support uplink sensing with multiple beams in a shared spectrum in accordance with aspects of the present disclosure.
Figure 6B:
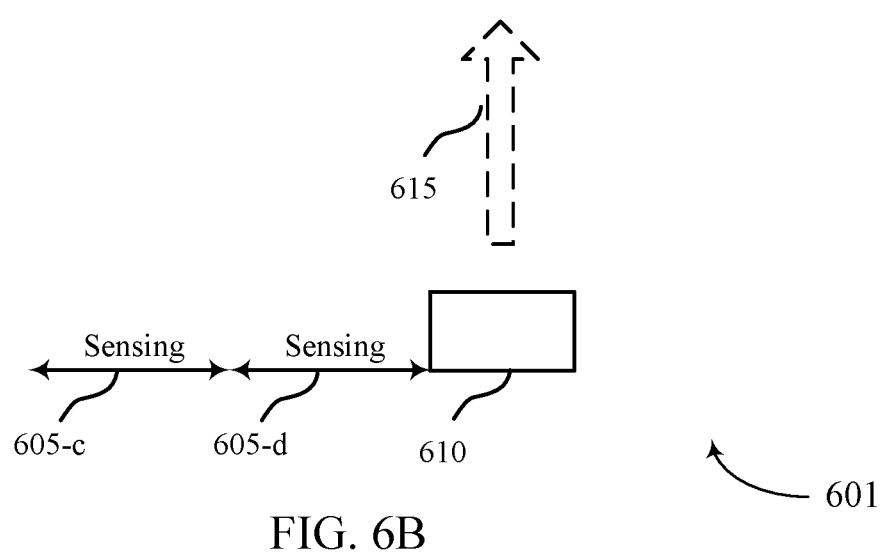

FIGS. 6A and 6B illustrate examples 600 and 601 that support uplink sensing with multiple beams in a shared spectrum in accordance with aspects of the present disclosure. In some aspects, the examples 600 and 601 may be implemented by aspects of the wireless communications system 100 and the wireless communications system 200. FIGS. 6A and 6B illustrate aspects of techniques for channel sensing in a shared spectrum in some wireless communications systems. The examples 600 and 601 illustrate aspects of channel sensing by a UE 115 over multiple beams (beam directions) indicated by a base station 105.

Referring to FIGS. 6A and 6B, the base station 105 may transmit and the UE 115-a may receive a grant or grants (e.g., first grant 215, second grant 220 described with reference to FIG. 2) indicating a single resource allocation 610 (e.g., a single set of resources) and a plurality of beams. The UE 115 may perform channel access procedures simultaneously. In an aspect, the UE 115 may perform channel access procedures simultaneously over multiple beams (e.g., sensing 605-a over a beam, sensing 605-b over another beam) and may select one or more beams (e.g., beam(s) 615) of the plurality of beams based on successful completion of channel access procedures (e.g., sensing results). The UE 115 may transmit an uplink transmission over the resource allocation 610 based on successful completion of one or more of the channel access procedures.

In some aspects, the base station 105 may configure a number (quantity) of beam directions available for uplink transmissions by the UE 115 based on a capability of the UE 115 associated with performing channel access procedures. In some cases, the base station 105 may configure the resource allocation for the UE 115 based on the capability. A capability of the UE 115 may be that the UE 115 may support simultaneous channel sensing. In an aspect, the UE 115 may support simultaneous channel sensing for different beams (e.g., support simultaneously performing sensing 605-a and sensing 605-b), as illustrated in FIG. 6A. A capability of the UE 115 may be that the UE 115 supports sequential channel sensing. In an aspect, the UE 115 may support sequential channel sensing for different beams (e.g., support sequentially performing sensing 605-c and sensing 605-d in a time domain manner over separate time periods), as illustrated in FIG. 6B. In some aspects, the UE 115 may transmit a message to the base station 105 including an indication of the capability of the UE 115 (e.g., simultaneous channel sensing support). Accordingly, the base station 105 may indicate, in a grant, multiple beam directions available for uplink transmissions (e.g., multiple beam sensing directions).

The UE 115 may perform one or more channel access procedures (e.g., based on a first channel access type or second channel access type) up to a target transmission time. In a case in which the UE 115 successfully completes a channel access procedure for one sensing beam direction (over a sensing beam) before the target transmission time (e.g., determines a measured energy associated the sensing 605-a is below an ED threshold), the UE 115 may stop any remaining channel sensing procedures for other beam directions, and in some aspects, select the beam direction associated with the successfully completed channel access procedure. In some aspects, the UE 115 may insert a filler signal (e.g., an extended cyclic prefix, to fill a time gap prior to the target transmission time) based on the successful completion of the channel access procedure, so as to reserve (acquire) the channel associated with the successfully completed channel access procedure.

In another aspect, the UE 115 may successfully complete a channel access procedure (e.g., sensing 605-a, sensing 605-c) for one sensing beam direction based on a first channel access type (e.g., type1 or type2). The UE 115 may perform channel access procedures for remaining sensing beam directions based on the same channel access type. In an aspect, the UE 115 may select the best N beams from among the beams associated with a successfully completed channel access procedure. In other aspects, for type1 channel sensing procedures, the sensing time (duration) may be different among different beam directions. In some aspects, for type2 channel sensing procedures, the sensing time (duration) may be the same among different beam directions.

In another aspect, in the case in which the UE 115 successfully completes a channel access procedure (e.g., sensing 605-a, sensing 605-c) for one sensing beam direction based on a first channel access type (e.g., type1), the UE 115 may perform channel access procedures for remaining sensing beam directions based on a second channel access type (e.g., type 2). In an aspect, the UE 115 may select the best N beams from among the beams associated with a successfully completed channel access procedure. The UE 115 may switch to sensing using the second channel access type based on criteria indicated by the base station 105. In an aspect, the criteria may include beam correspondence between the one sensing beam direction and remaining sensing beam directions, ED thresholds associated with the one sensing beam direction and remaining sensing beam directions, or transmission power associated with the remaining beam directions.

In reference to sequential channel sensing (time domain manner) for different beams as described with reference to FIG. 6B, in a case in which type1 channel access procedure is used, the sensing time before reserving (acquiring) a channel may be random depending on a pattern of idleness associated with the channel. In some aspects, the UE 115 may switch from one beam direction to another beam direction based on a configuration of the UE 115. In some other aspects, the UE 115 may switch to another beam direction based on a timer (e.g., an expiration of the timer) configured by the base station 105. The base station 105 may indicate the timer, in some aspects, in the grant for uplink transmissions described herein.

In some aspects, for the sequential channel sensing (time domain manner), the UE 115 may determine a sequence of beams to be used during channel sensing based on prior measurement information (e.g., measurement history). In an aspect, the UE 115 may identify a beam direction having a higher chance of being idle (based on measurement history) among beam directions indicated in a grant (or grants) from the base station 105. Accordingly, the UE 115 may perform channel access procedures for the identified beam direction prior to other beam directions indicated in the grant (or grants).

In some aspects, for type1 channel access procedures over different beam directions, either in a simultaneous manner as described with reference to FIG. 6A or in a sequential manner (time domain manner) as described with reference to FIG. 6B, the random initial value of the counter may be determined independently for each channel access procedure associated with a beam direction. Alternatively, a single random initial value of the counter may be determined and applied to all of the channel access procedures.

Figure 7:
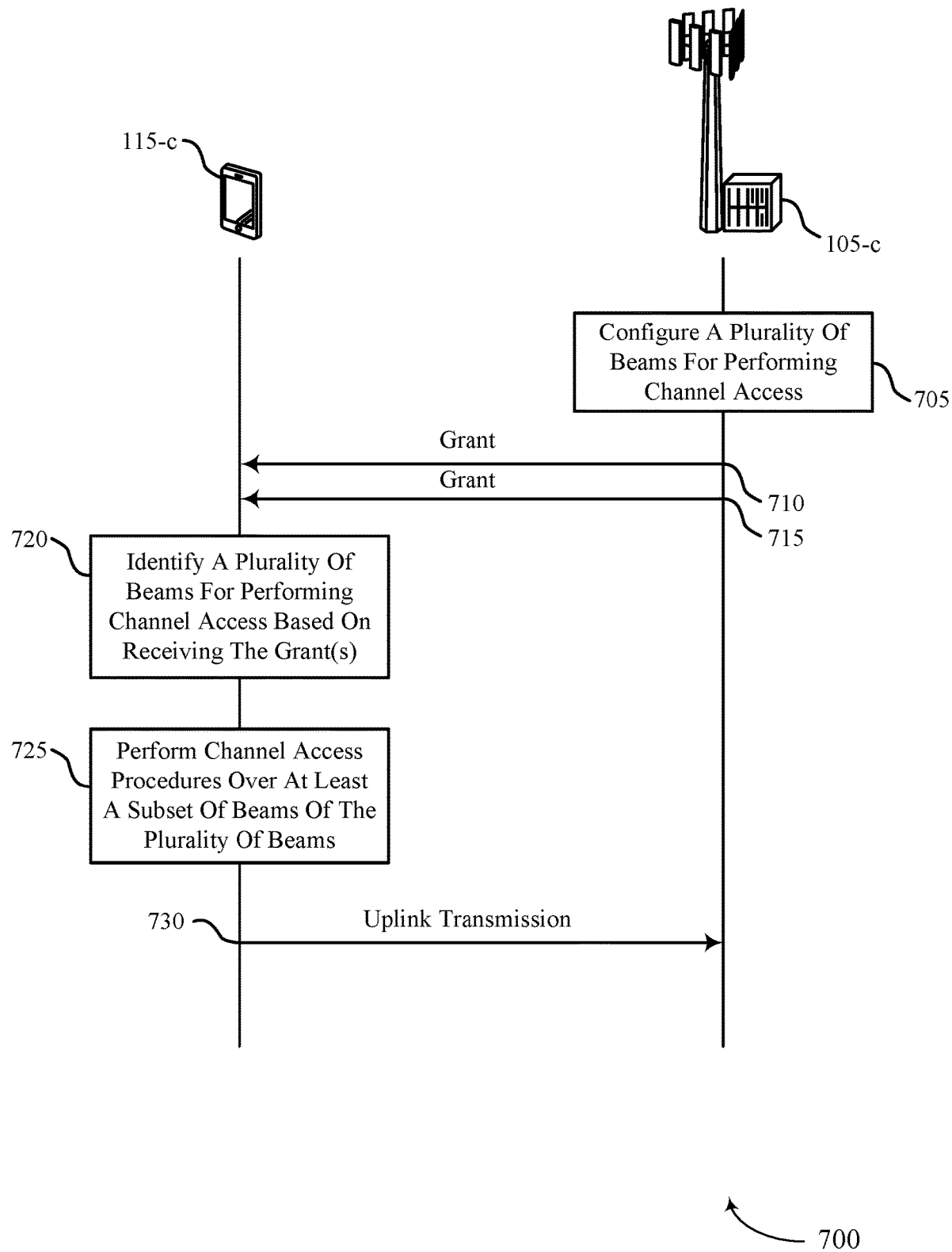
FIG. 7 illustrates an example of a process flow that supports uplink sensing with multiple beams in a shared spectrum in accordance with aspects of the present disclosure.

FIG. 7 illustrates an example of a process flow 700 that supports uplink sensing with multiple beams in a shared spectrum in accordance with aspects of the present disclosure. In some aspects, process flow 700 may implement aspects of wireless communications systems 100 or 200. Further, process flow 700 may be implemented by a UE 115-c and a base station 105-c, which may be examples of a UE 115 and a base station 105 described with reference to FIGS. 1 and 2.

In the following description of the process flow 700, the operations between UE 115-c and base station 105-c may be transmitted in a different order than the order shown, or the operations performed by base station 105-c and UE 115-c may be performed in different orders or at different times. Certain operations may also be left out of the process flow 700, or other operations may be added to the process flow 700. It is to be understood that while base station 105-c and UE 115-c are shown performing a number of the operations of process flow 700, any wireless device may perform the operations shown.

At 705, the base station 105-c may configure a plurality of beams for performing channel access for the UE 115-c for uplink transmissions.

At 710, the UE 115-c may receive a grant from the base station 105-c of a set of resources for an uplink transmission. In some aspects, at 710, the UE 115-c may receive a single grant from the base station 105-c including an indication of the plurality of beams for performing the channel access for the uplink transmission.

In some other aspects, at 710, the UE 115-c may receive a first grant from the base station 105-c including an indication of a first subset of beams of the plurality of beams. In an aspect, at 715, the UE 115-c may receive a second grant from the base station 105-c including an indication of a second subset of beams of the plurality of beams.

At 720, the UE 115-c may identify a plurality of beams for performing channel access for the uplink transmission based on receiving the grant. In some aspects, the UE 115-c may identify the plurality of beams for performing channel access for the uplink transmission based on receiving the first grant and receiving the second grant.

At 725, the UE 115-c may perform channel access procedures over at least a subset of beams of the plurality of beams.

At 730, the UE 115-c may transmit (e.g., transmit an uplink transmission) over one or more beams of the subset of beams based on successful completion of one or more of the channel access procedures.

Figure 8:
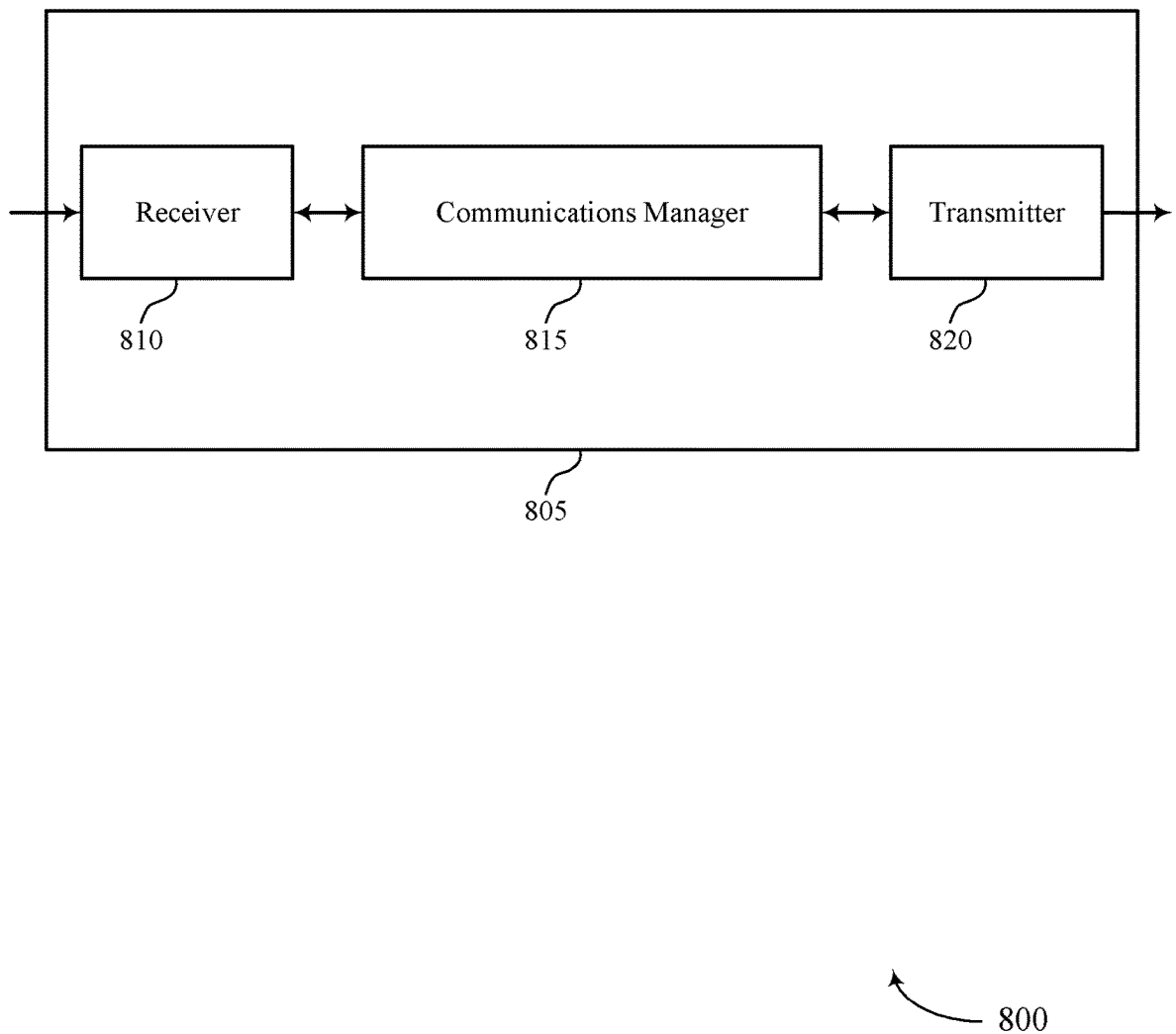
FIGS. 8 and 9 show block diagrams of devices that support uplink sensing with multiple beams in a shared spectrum in accordance with aspects of the present disclosure.

FIG. 8 shows a block diagram 800 of a device 805 that supports uplink sensing with multiple beams in a shared spectrum in accordance with aspects of the present disclosure. The device 805 may be an example of aspects of a wireless node in the wireless communications systems as described herein (e.g., a UE 115 as described herein in an access network, an MT entity of IAB node in a IAB network). The receiver 810 may receive information such as packets, user data, or control information associated with various information channels (e.g., control channels, data channels, and information related to uplink sensing with multiple beams in a shared spectrum, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a grant of a set of resources for an uplink transmission, identify a set of beams for performing channel access for the uplink transmission based on receiving the grant, transmit over one or more beams of the subset of beams based on successful completion of one or more of the channel access procedures, and perform channel access procedures over at least a subset of beams of the set of beams. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some aspects, the communications manager 815, or its sub-components, may be a separate and distinct component in accordance with various aspects of the present disclosure. In some aspects, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some aspects, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

By including or configuring the communications manager 815 in accordance with examples as described herein, the device 805 (e.g., a processor controlling or otherwise coupled to the receiver 810, the transmitter 820, the communications manager 815, or a combination thereof) may support techniques for the device 805 to select, for transmitting an uplink transmission, a beam from a set of beams for which the device 805 has successfully performed a channel access procedure and which has a lowest associated energy channel level. The transmission transmitted over this beam may be associated with less interference than other beams of the set beams. Accordingly, the efficiency of communications between the device 805 and a base station may increase.

Figure 9:
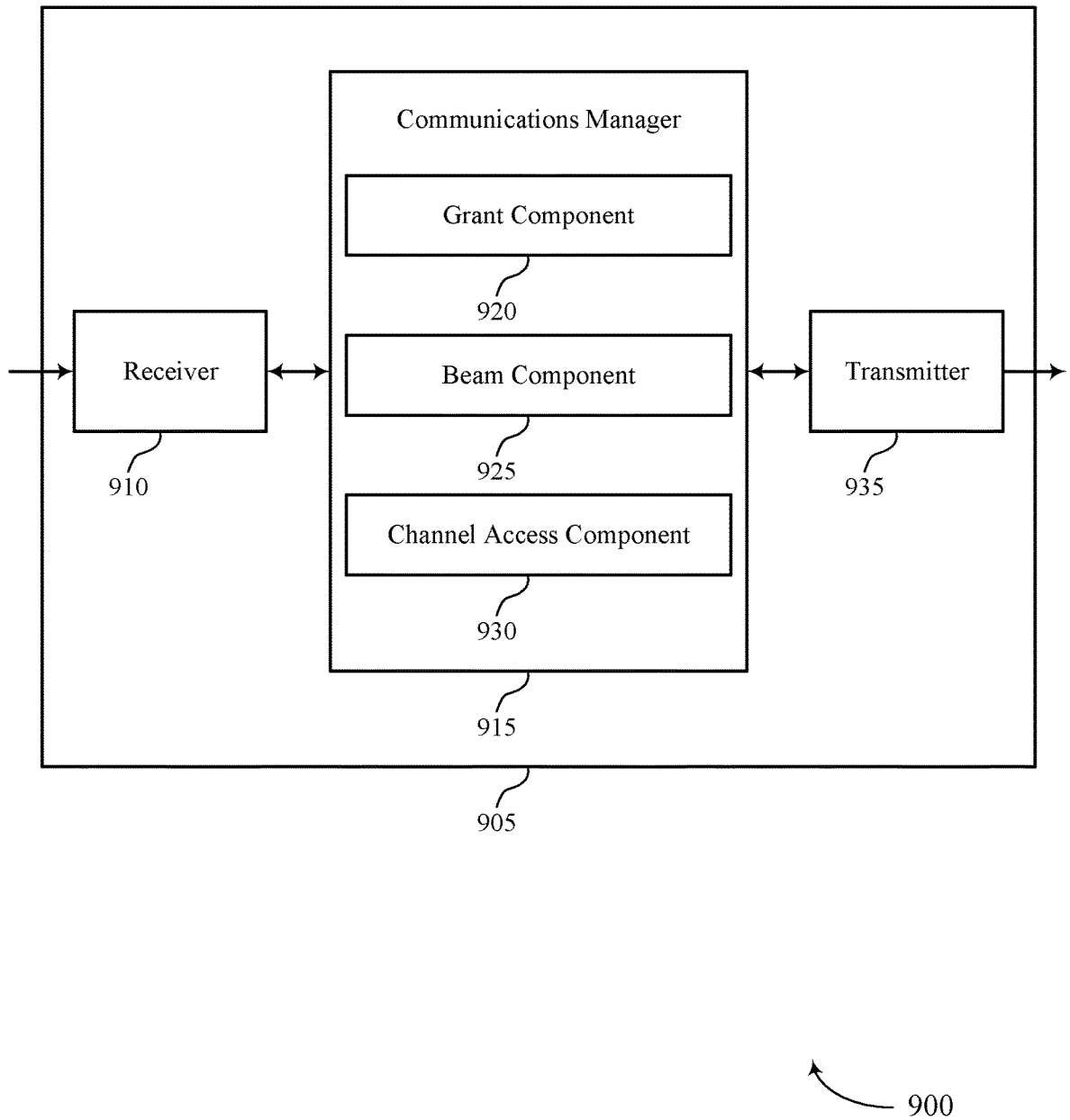

FIG. 9 shows a block diagram 900 of a device 905 that supports uplink sensing with multiple beams in a shared spectrum in accordance with aspects of the present disclosure. The device 905 may be an example of aspects of a device 805, or a wireless node as described herein (e.g., a UE 115 as described herein, an MT entity of IAB node in a IAB network). The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to uplink sensing with multiple beams in a shared spectrum, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a grant component 920, a beam component 925, and a channel access component 930. The communications manager 915 may be an example of aspects of the communications manager 1110 described herein.

The grant component 920 may receive a grant of a set of resources for an uplink transmission.

The beam component 925 may identify a set of beams for performing channel access for the uplink transmission based on receiving the grant and transmit over one or more beams of the subset of beams based on successful completion of one or more of the channel access procedures.

The channel access component 930 may perform channel access procedures over at least a subset of beams of the set of beams.

The transmitter 935 may transmit signals generated by other components of the device 905. In some aspects, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
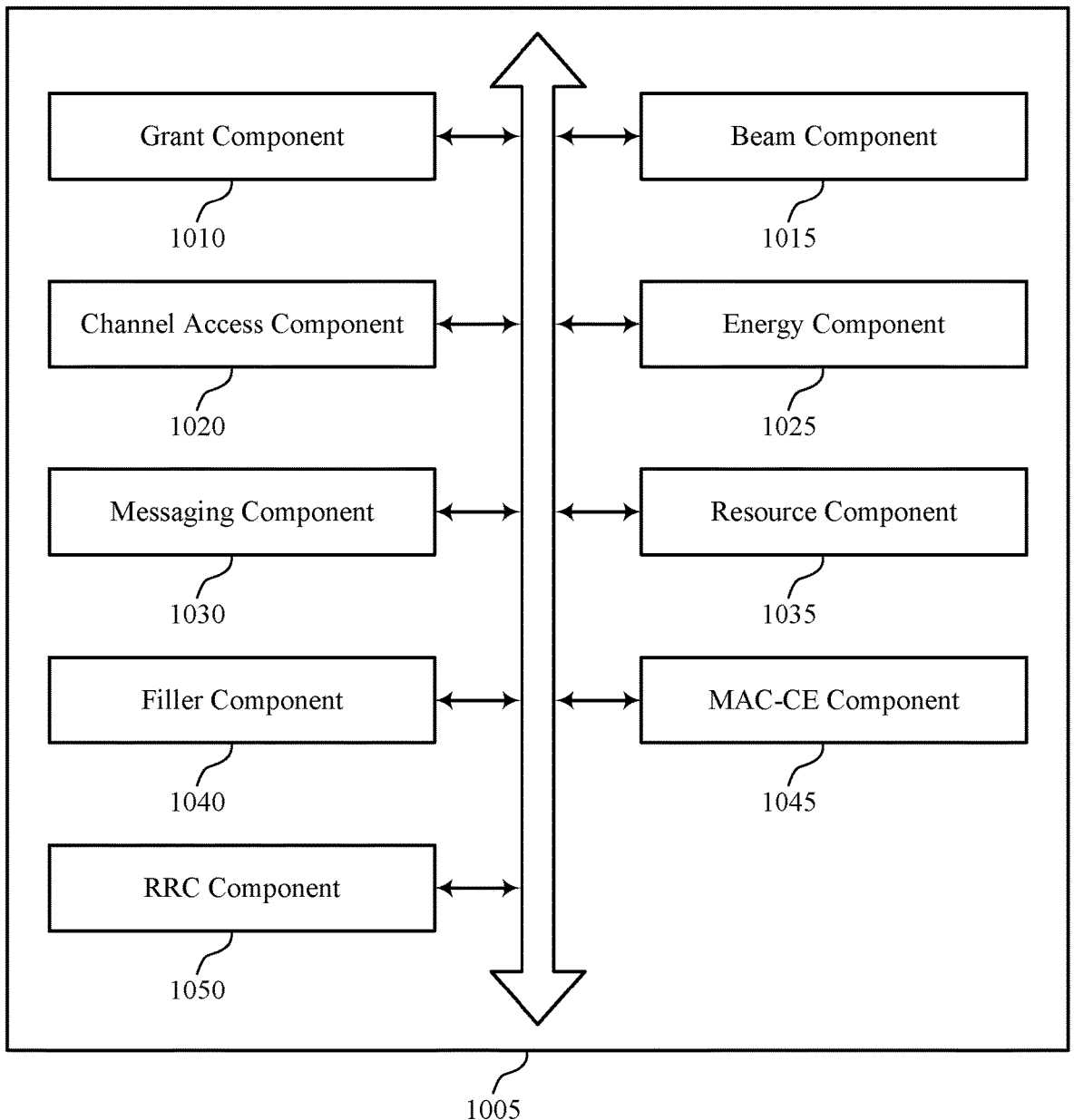
FIG. 10 shows a block diagram of a communications manager that supports uplink sensing with multiple beams in a shared spectrum in accordance with aspects of the present disclosure.

FIG. 10 shows a block diagram 1000 of a communications manager 1005 that supports uplink sensing with multiple beams in a shared spectrum in accordance with aspects of the present disclosure. The communications manager 1005 may be an example of aspects of a communications manager 815, a communications manager 915, or a communications manager 1110 described herein. The communications manager 1005 may include a grant component 1010, a beam component 1015, a channel access component 1020, an energy component 1025, a messaging component 1030, a resource component 1035, a filler component 1040, a MAC-CE component 1045, and a RRC component 1050. Each of these modules may communicate, directly or indirectly, with one another (e.g., via one or more buses).

The grant component 1010 may receive a grant of a set of resources for an uplink transmission. In some aspects, the grant component 1010 may receive a single grant including an indication of the set of beams for performing the channel access for the uplink transmission. In some aspects, the grant component 1010 may receive a first grant including an indication of a first subset of beams of the set of beams. In some aspects, the grant component 1010 may receive a second grant including an indication of a second subset of beams of the set of beams. In some aspects, the grant component 1010 may receive a DCI message including an indication of the set of beams for performing the channel access for the uplink transmission. In some cases, the wireless node includes a UE in an access network or a MT entity of an IAB node in a IAB network.

The beam component 1015 may identify a set of beams for performing channel access for the uplink transmission based on receiving the grant. In some aspects, the beam component 1015 may transmit over one or more beams of the subset of beams based on successful completion of one or more of the channel access procedures. In some aspects, the beam component 1015 may identify the set of beams for performing the channel access is based on the receiving the first grant and receiving the second grant. In some aspects, the beam component 1015 may select the one or more beams of the subset of beams based on the determined energy levels of the beams of the subset of beams associated with the successfully completed one or more channel access procedures. In some aspects, the beam component 1015 may select a beam of the subset of beams based on determining the energy level of the beam satisfies a threshold. In some aspects, transmitting over the one or more beams of the subset of beams includes transmitting over the beam.

In some aspects, the beam component 1015 may select two or more beams of the subset of beams based at least in part determining the respective energy levels of the two or more beams satisfy a threshold. In some aspects, transmitting over the one or more beams of the subset of beams includes transmitting over the two or more beams. In some aspects, the beam component 1015 may select a predetermined quantity of beams of the subset of beams based on determining the respective energy levels of the predetermined quantity of beams have a lowest energy level among the beams of the subset of beams associated with the successfully completed one or more channel access procedures. In some aspects, transmitting over the one or more beams of the subset of beams includes transmitting over the predetermined quantity of beams.

In some aspects, the beam component 1015 may receive an indication of a maximum quantity of beams over which the wireless node is permitted to transmit. In some aspects, the beam component 1015 may transmit over the one or more beams of the subset of beams is based on receiving the indication of the maximum quantity of beams. In some aspects, the beam component 1015 may identify the set of beams for performing the channel access for the uplink transmission, performing the channel access procedures over at least the subset of beams, or both, is based on the capability. In some aspects, transmitting over the one or more beams of the subset of beams based on successful completion of one or more of the channel access procedures includes determining the one or more resource allocations for the uplink transmission based on successful completion of the one or more of the channel access procedures over the subset of beams over which the channel access procedures are performed.

In some aspects, the beam component 1015 may transmit over a second quantity of the subset of beams based on respective energy levels of the subset of beams. In some aspects, the beam component 1015 may transmit over a second quantity of the subset of beams based on respective energy levels of the subset of beams, a beam correspondence between the remaining beams and the first beam, a transmit power for the remaining beams, or a combination thereof. In some aspects, the beam component 1015 may transmit over the one or more beams of the subset of beams is based on inserting the filler signal. In some aspects, the beam component 1015 may transmit over the one or more beams of the subset of beams is based on inserting the extended cyclic prefix.

The channel access component 1020 may perform channel access procedures over at least a subset of beams of the set of beams. In some aspects, the channel access component 1020 may perform a first channel access procedure over a first beam of the subset of beams over a first time period. In some aspects, the channel access component 1020 may perform a second channel access procedure over a second beam of the subset of beams over the first time period or a second time period. In some aspects, the channel access component 1020 may determine that a first channel access procedure over a first beam of the subset of beams is successful. In some aspects, the channel access component 1020 may terminate the channel access procedures over remaining beams of the set of beams based on transmitting over the one or more beams of the subset of beams.

In some aspects, the channel access component 1020 may continue to perform the channel access procedures of the first type for remaining beams of the subset of beams.

In some aspects, the channel access component 1020 may determine that a first quantity of the channel access procedures are successful. In some aspects, the channel access component 1020 may switch a type of the channel access procedures for remaining beams of the subset of beams to a second type channel access procedure based on the determining that the first channel access procedure is successful. In some aspects, the channel access component 1020 may determine that a first quantity of the channel access procedures for the first beam and the remaining beams are successful.

The energy component 1025 may determine energy levels of beams of the subset of beams associated with the successfully completed one or more channel access procedures. The messaging component 1030 may transmit a message including an indication of a capability of the wireless node associated with the channel access procedures. The resource component 1035 may receive one or more resource allocations for the uplink transmission, where each of the one or more resource allocations for the uplink transmission is associated with a beam of the subset of beams over which the channel access procedures are performed. In some aspects, the first subset of resources are fully-overlapping, at least partially overlapping, or non-overlapping with the second subset of resources.

In some cases, the resource component 1035 may receive a first resource allocation for a first uplink transmission, where the first resource allocation is associated with a first subset of beams of the subset of beams over which the channel access procedures are performed and a first subset of resources. In some cases, the resource component 1035 may receive a second resource allocation for a second uplink transmission, where the second resource allocation is associated with a second subset of beams of the subset of beams over which the channel access procedures are performed and a second subset of resources.

The filler component 1040 may insert a filler signal based on the successful completion of one or more of the channel access procedures. In some aspects, the filler component 1040 may insert an extended cyclic prefix based on the successful completion of one or more of the channel access procedures. The MAC-CE component 1045 may receive a medium access control (MAC) control element (MAC-CE) including an indication of the set of beams for performing the channel access for the uplink transmission. The RRC component 1050 may receive a RRC message including an indication of the set of beams for performing the channel access for the uplink transmission.

Figure 11:
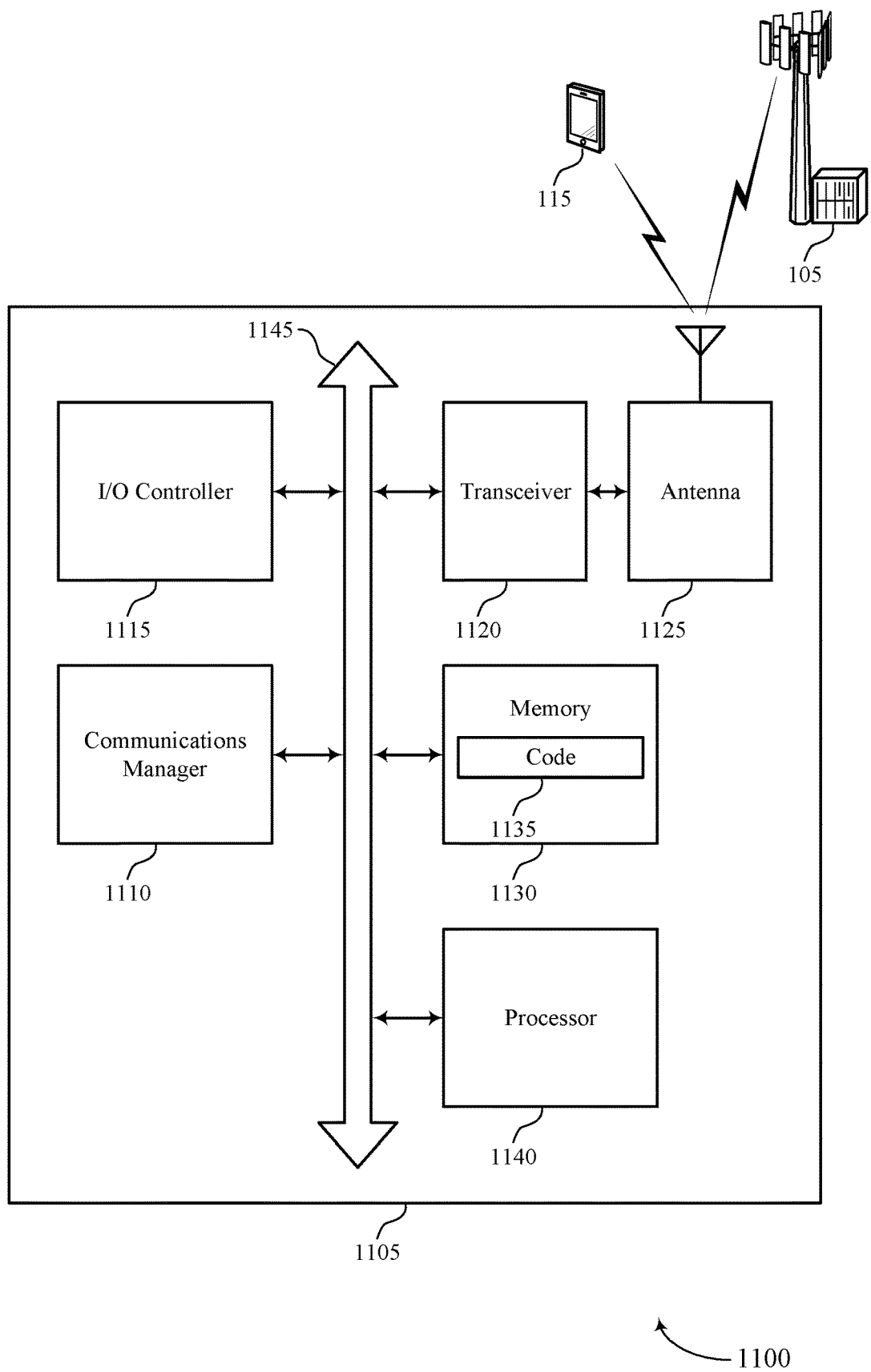
FIG. 11 shows a diagram of a system including a device that supports uplink sensing with multiple beams in a shared spectrum in accordance with aspects of the present disclosure.

FIG. 11 shows a diagram of a system 1100 including a device 1105 that supports uplink sensing with multiple beams in a shared spectrum in accordance with aspects of the present disclosure. The device 1105 may be an example of or include the components of device 805, device 905, or a wireless node as described herein (e.g., a UE 115 as described herein, an MT entity of IAB node in a IAB network). The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a grant of a set of resources for an uplink transmission, identify a set of beams for performing channel access for the uplink transmission based on receiving the grant, transmit over one or more beams of the subset of beams based on successful completion of one or more of the channel access procedures, and perform channel access procedures over at least a subset of beams of the set of beams.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink sensing with multiple beams in a shared spectrum).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

By including or configuring the communications manager 1110 in accordance with examples as disclosed herein, the device 1105 may support techniques for the device 1105 to select, for transmitting an uplink transmission, a beam from a set of beams for which the device 1105 has successfully performed a channel access procedure and which has a lowest associated energy channel level. The transmission transmitted over this beam may be associated with less interference than other beams of the set beams. Accordingly, the efficiency of communications between the device 1105 and a base station may increase.

Figure 12:
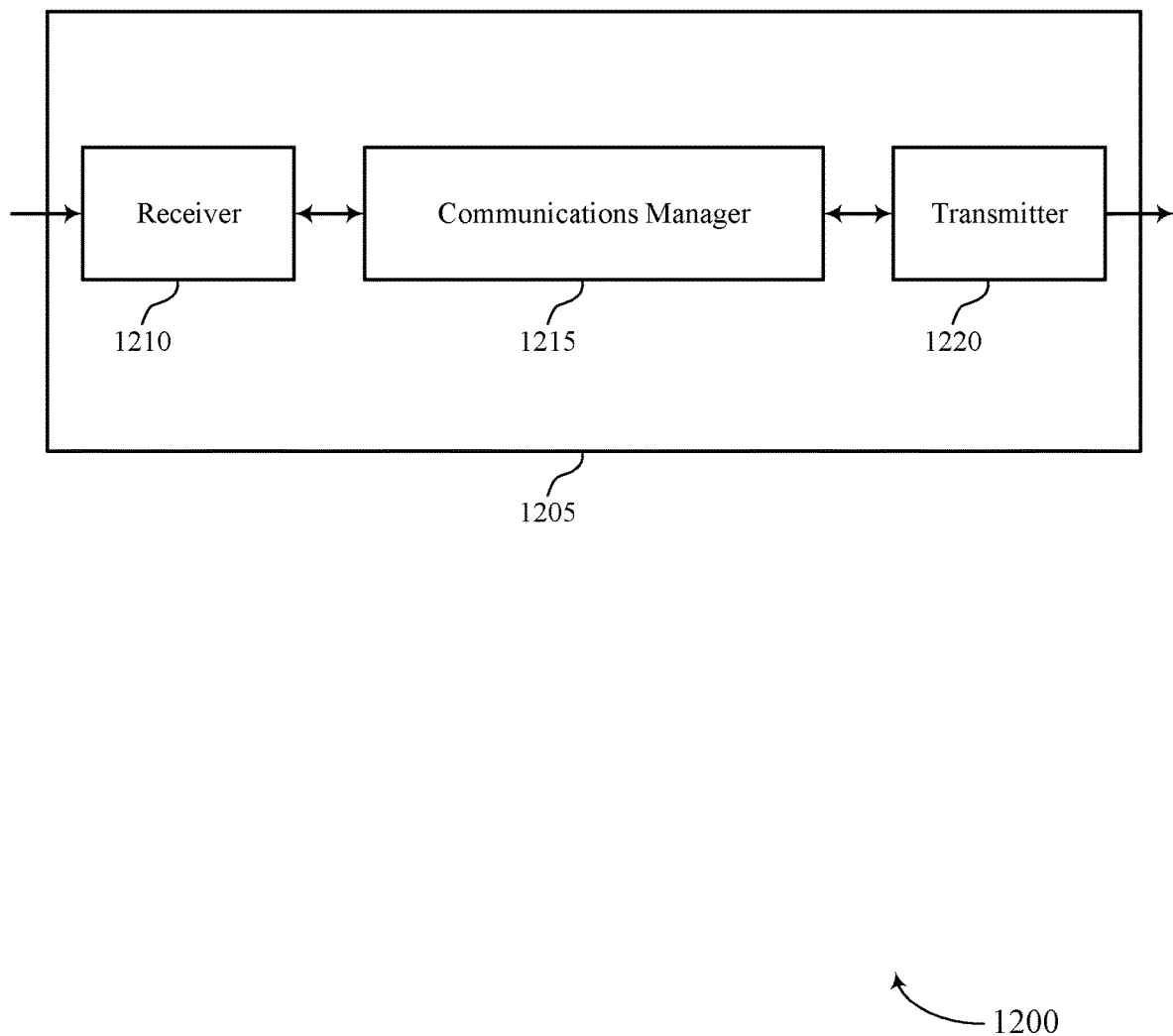
FIGS. 12 and 13 show block diagrams of devices that support uplink sensing with multiple beams in a shared spectrum in accordance with aspects of the present disclosure.

FIG. 12 shows a block diagram 1200 of a device 1205 that supports uplink sensing with multiple beams in a shared spectrum in accordance with aspects of the present disclosure. The device 1205 may be an example of aspects of a wireless node in the wireless communications systems as described herein (e.g., a base station 105 as described herein in an access network, a DU of an IAB node in an IAB network, a CU of an IAB donor node in the IAB network). The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to uplink sensing with multiple beams in a shared spectrum, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may configure a set of beams for performing channel access for another wireless node for uplink transmissions, transmit a grant of a set of sets of resources for uplink transmissions to the other wireless node, each of the set of sets of resources associated with one or more beams of the set of beams, and receive an uplink transmission from the other wireless node over at least one beam of the set of beams and over at least one set of resources of the set of sets of resources. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some aspects, the communications manager 1215, or its sub-components, may be a separate and distinct component in accordance with various aspects of the present disclosure. In some aspects, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some aspects, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

By including or configuring the communications manager 1215 in accordance with examples as described herein, the device 1205 (e.g., a processor controlling or otherwise coupled to the receiver 1210, the transmitter 1220, the communications manager 1215, or a combination thereof) may support techniques for the device 1205 to enable a UE 115 to select, for transmitting an uplink transmission, a beam from a set of beams for which the UE 115 has successfully performed a channel access procedure and which has a lowest associated energy channel level. The transmission received at the device 1205 via this beam may be associated with less interference than other beams of the set beams. Accordingly, the efficiency of communications between the device 1205 and the UE 115 may increase.

Figure 13:
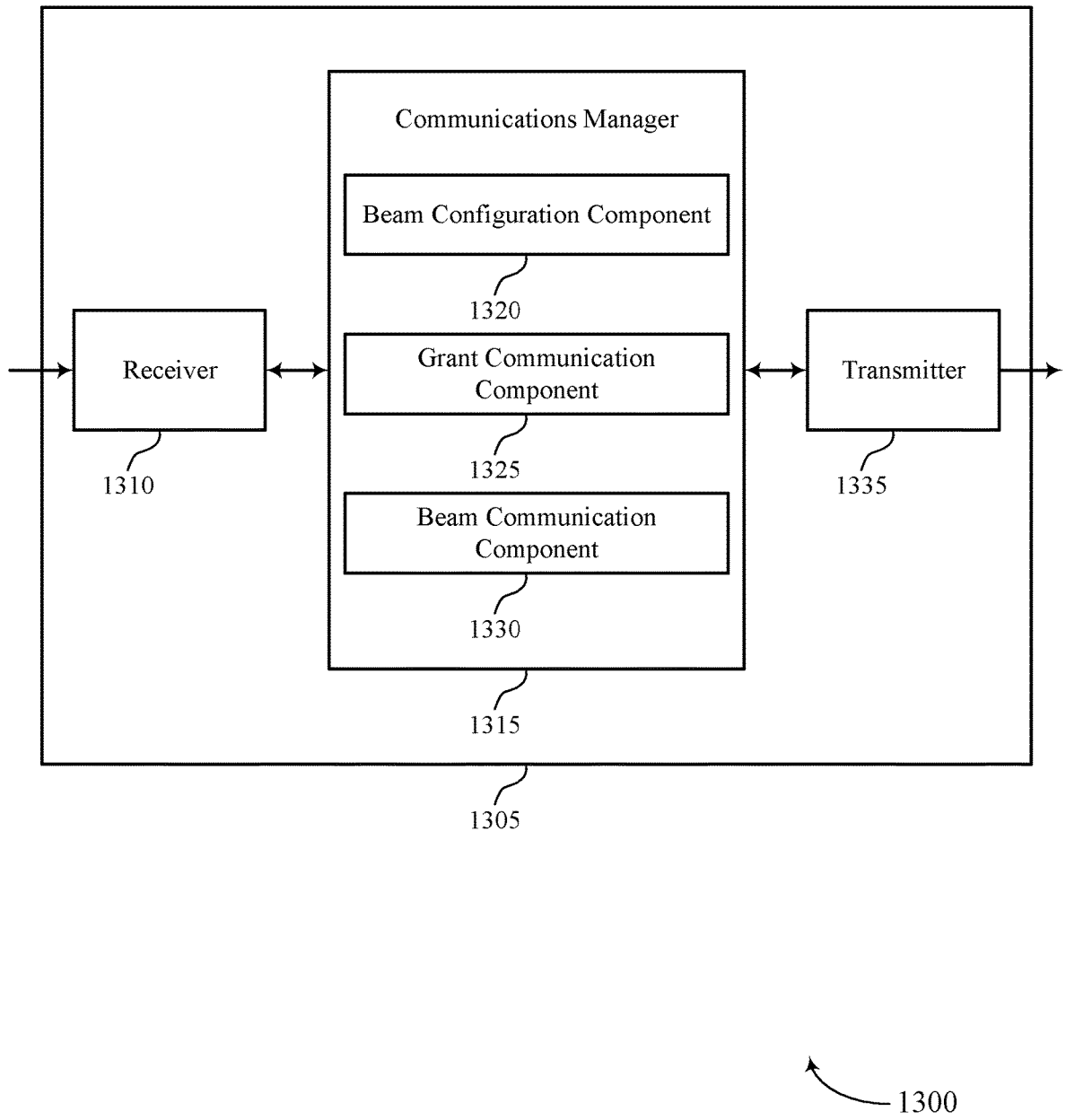

FIG. 13 shows a block diagram 1300 of a device 1305 that supports uplink sensing with multiple beams in a shared spectrum in accordance with aspects of the present disclosure. The device 1305 may be an example of aspects of a device 1205, or a wireless node in the wireless communications systems as described herein (e.g., a base station 105 as described herein, a DU of an IAB node in an IAB network, a CU of an IAB donor node in the IAB network). The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to uplink sensing with multiple beams in a shared spectrum, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a beam configuration component 1320, a grant communication component 1325, and a beam communication component 1330. The communications manager 1315 may be an example of aspects of the communications manager 1510 described herein.

The beam configuration component 1320 may configure a set of beams for performing channel access for another wireless node for uplink transmissions. The grant communication component 1325 may transmit a grant of a set of sets of resources for uplink transmissions to the other wireless node, each of the set of sets of resources associated with one or more beams of the set of beams. The beam communication component 1330 may receive an uplink transmission from the other wireless node over at least one beam of the set of beams and over at least one set of resources of the set of sets of resources.

The transmitter 1335 may transmit signals generated by other components of the device 1305. In some aspects, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
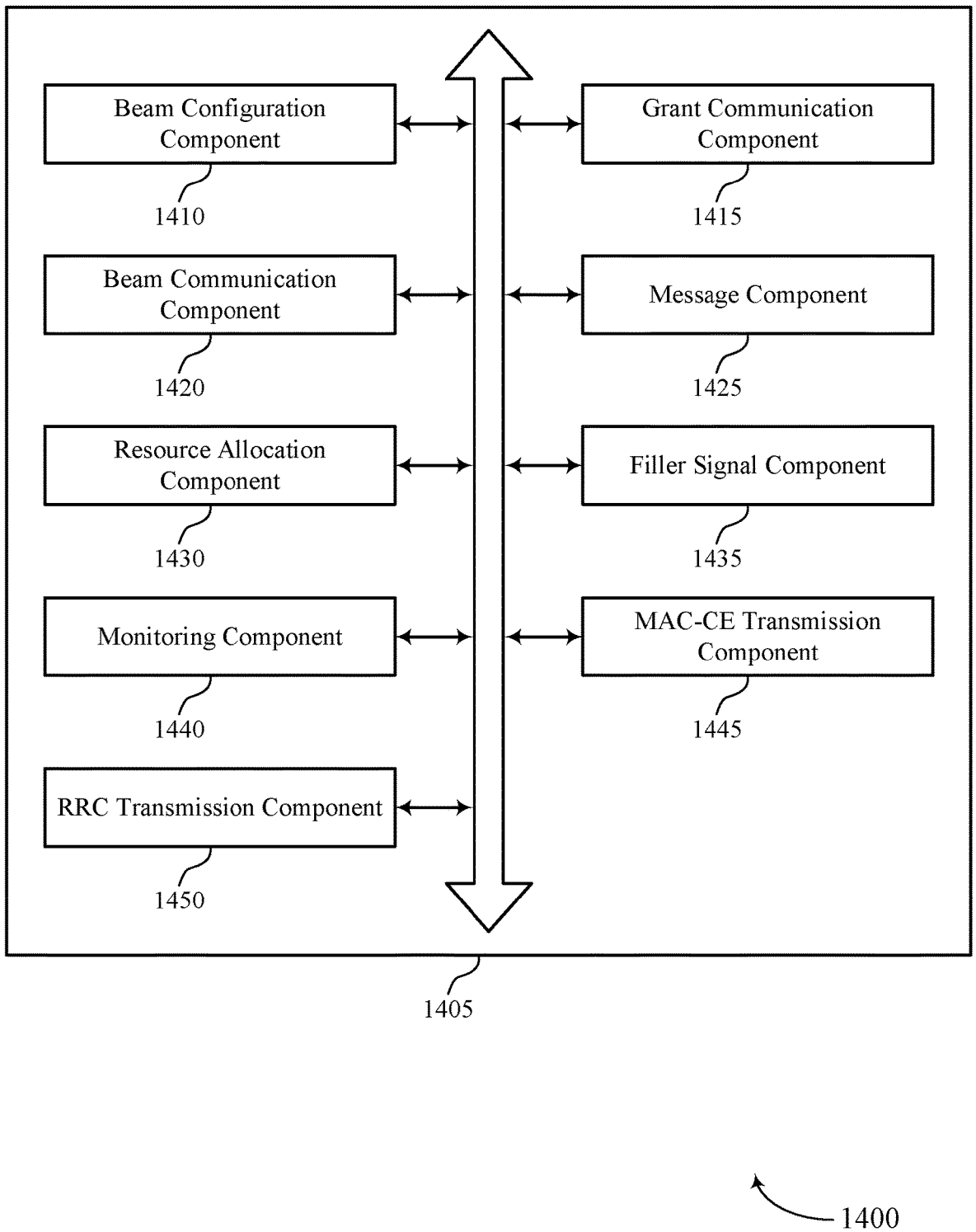
FIG. 14 shows a block diagram of a communications manager that supports uplink sensing with multiple beams in a shared spectrum in accordance with aspects of the present disclosure.

FIG. 14 shows a block diagram 1400 of a communications manager 1405 that supports uplink sensing with multiple beams in a shared spectrum in accordance with aspects of the present disclosure. The communications manager 1405 may be an example of aspects of a communications manager 1215, a communications manager 1315, or a communications manager 1510 described herein. The communications manager 1405 may include a beam configuration component 1410, a grant communication component 1415, a beam communication component 1420, a message component 1425, a resource allocation component 1430, a filler signal component 1435, a monitoring component 1440, a MAC-CE transmission component 1445, and a RRC transmission component 1450. Each of these modules may communicate, directly or indirectly, with one another (e.g., via one or more buses).

The beam configuration component 1410 may configure a set of beams for performing channel access for another wireless node for uplink transmissions. In some aspects, the beam configuration component 1410 may configure the set of beams based on the capability. The grant communication component 1415 may transmit a grant of a set of sets of resources for uplink transmissions to the other wireless node, each of the set of sets of resources associated with one or more beams of the set of beams. In some aspects, the beam configuration component 1410 may configure the set of beams based on the capability.

In some aspects, the grant communication component 1415 may transmit a single grant including an indication of the set of beams. In some aspects, the grant communication component 1415 may transmit a first grant including an indication of a first beam of the set of beams. In some aspects, the grant communication component 1415 may transmit a second grant including an indication of a second beam of the set of beams. In some aspects, the grant communication component 1415 may transmit an indication of a maximum quantity of beams over which the other wireless node is permitted to transmit. In some aspects, the grant communication component 1415 may transmit a DCI message including an indication of the set of beams for performing the channel access for the uplink transmission. In some cases, the wireless node includes a base station in an access network, a DU of an IAB node in a IAB network, or a CU of an IAB donor node in the IAB network.

The beam communication component 1420 may receive an uplink transmission from the other wireless node over at least one beam of the set of beams and over at least one set of resources of the set of sets of resources. In some aspects, the beam communication component 1420 may receive over the one or more beams based on the capability. In some aspects, the beam communication component 1420 may receive over the at least one beam of the subset of beams is based on transmitting the indication of the maximum quantity of beams. In some aspects, the beam communication component 1420 may receive over the one or more beams is based on the one or more resource allocations. In some aspects, the beam communication component 1420 may receive over the at least one beam is based on an insertion of the filler signal by the other wireless node. In some aspects, the beam communication component 1420 may receive over the at least one beam is based on an insertion of the extended cyclic prefix by the other wireless node. In some aspects, the beam communication component 1420 may receive over the one or more beams of the set of beams is based on monitoring the set of sets of resources.

The message component 1425 may receive a message including an indication of a capability of the other wireless node associated with channel access procedures. The resource allocation component 1430 may transmit one or more resource allocations for the uplink transmission, where each of the one or more resource allocations for the uplink transmission is associated with a beam of the subset of beams over which channel access procedures are performed by the other wireless node. In some aspects, the first subset of resources are fully-overlapping, at least partially overlapping, or non-overlapping with the second subset of resources. In some cases, the resource allocation component 1430 may transmit a first resource allocation for a first uplink transmission, where the first resource allocation is associated with a first subset of beams of the subset of beams over which the channel access procedures are performed by the other wireless node and a first subset of resources. In some cases, the resource allocation component 1430 may transmit a second resource allocation for a second uplink transmission, where the second resource allocation is associated with a second subset of beams of the subset of beams over which the channel access procedures are performed by the other wireless node and a second subset of resources.

The filler signal component 1435 may transmit an indication for inserting a filler signal based on the successful completion of one or more of the channel access procedures. In some aspects, the filler signal component 1435 may transmit an indication for inserting an extended cyclic prefix based on the successful completion of one or more of the channel access procedures. The monitoring component 1440 may monitor the set of sets of resources.

The MAC-CE transmission component 1445 may transmit a medium access control (MAC) control element (MAC-CE) including an indication of the set of beams for performing the channel access for the uplink transmission. The RRC transmission component 1450 may transmit a RRC message including an indication of the set of beams for performing the channel access for the uplink transmission.

Figure 15:
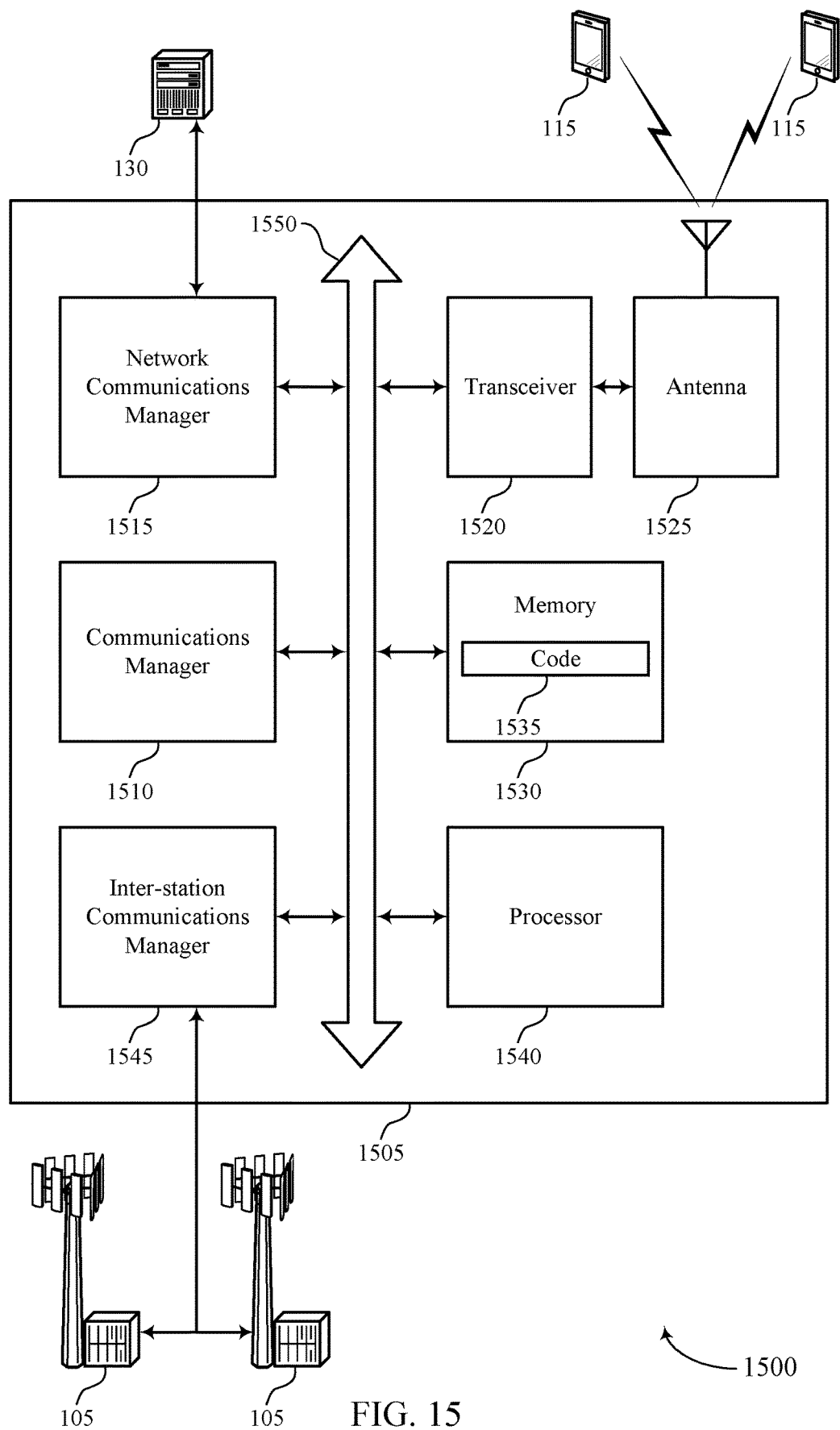
FIG. 15 shows a diagram of a system including a device that supports uplink sensing with multiple beams in a shared spectrum in accordance with aspects of the present disclosure.

FIG. 15 shows a diagram of a system 1500 including a device 1505 that supports uplink sensing with multiple beams in a shared spectrum in accordance with aspects of the present disclosure. The device 1505 may be an example of or include the components of device 1205, device 1305, or a wireless node in the wireless communications systems as described herein (e.g., a base station 105 as described herein, a DU of an IAB node in an IAB network, a CU of an IAB donor node in the IAB network). The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may configure a set of beams for performing channel access for another wireless node for uplink transmissions, transmit a grant of a set of sets of resources for uplink transmissions to the other wireless node, each of the set of sets of resources associated with one or more beams of the set of beams, and receive an uplink transmission from the other wireless node over at least one beam of the set of beams and over at least one set of resources of the set of sets of resources.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting uplink sensing with multiple beams in a shared spectrum).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some aspects, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

By including or configuring the communications manager 1510 in accordance with examples as disclosed herein, the device 1505 may support techniques for the device 1505 to enable a UE 115 to select, for transmitting an uplink transmission, a beam from a set of beams for which the UE 115 has successfully performed a channel access procedure and which has a lowest associated energy channel level. The transmission received at the device 1505 via this beam may be associated with less interference than other beams of the set beams. Accordingly, the efficiency of communications between the device 1505 and the UE 115 may increase.

Figure 16:
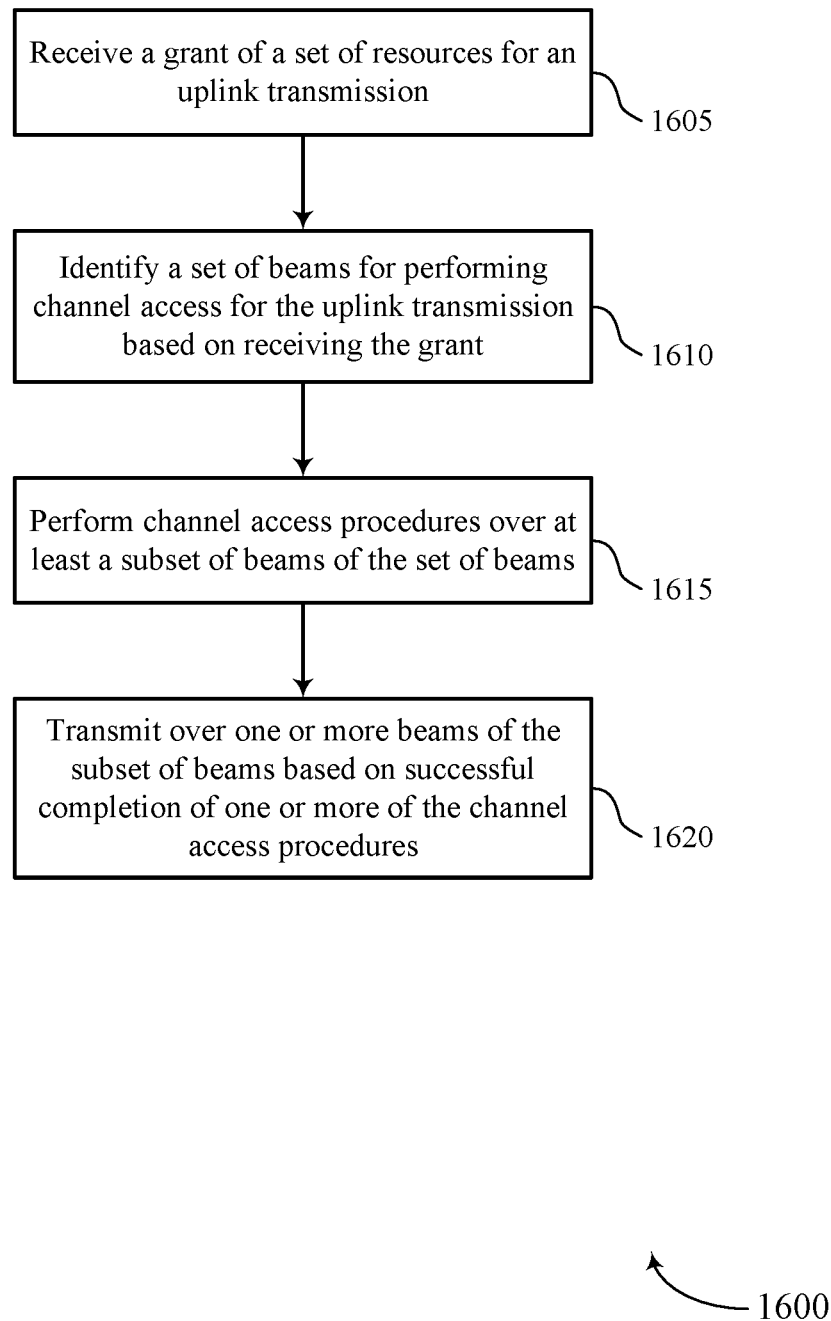
FIGS. 16 through 21 show flowcharts illustrating methods that support uplink sensing with multiple beams in a shared spectrum in accordance with aspects of the present disclosure.

FIG. 16 shows a flowchart illustrating a method 1600 that supports uplink sensing with multiple beams in a shared spectrum in accordance with aspects of the present disclosure. The operations of method 1600 may be implemented by a wireless node (e.g., a UE 115 as described herein, an MT entity of IAB node in an IAB network) or its components as described herein. For example, the operations of method 1600 may be performed by a communications manager as described with reference to FIGS. 8 through 11. In some aspects, a UE may execute a set of instructions to control the functional elements of the UE to perform the functions described below. Additionally or alternatively, a UE may perform aspects of the functions described below using special-purpose hardware.

At 1605, the UE may receive a grant of a set of resources for an uplink transmission. The operations of 1605 may be performed according to the methods described herein. In some aspects, aspects of the operations of 1605 may be performed by a grant component as described with reference to FIGS. 8 through 11.

At 1610, the UE may identify a set of beams for performing channel access for the uplink transmission based on receiving the grant. The operations of 1610 may be performed according to the methods described herein. In some aspects, aspects of the operations of 1610 may be performed by a beam component as described with reference to FIGS. 8 through 11.

At 1615, the UE may perform channel access procedures over at least a subset of beams of the set of beams. The operations of 1615 may be performed according to the methods described herein. In some aspects, aspects of the operations of 1615 may be performed by a channel access component as described with reference to FIGS. 8 through 11.

At 1620, the UE may transmit over one or more beams of the subset of beams based on successful completion of one or more of the channel access procedures. The operations of 1620 may be performed according to the methods described herein. In some aspects, aspects of the operations of 1620 may be performed by a beam component as described with reference to FIGS. 8 through 11.

Figure 17:
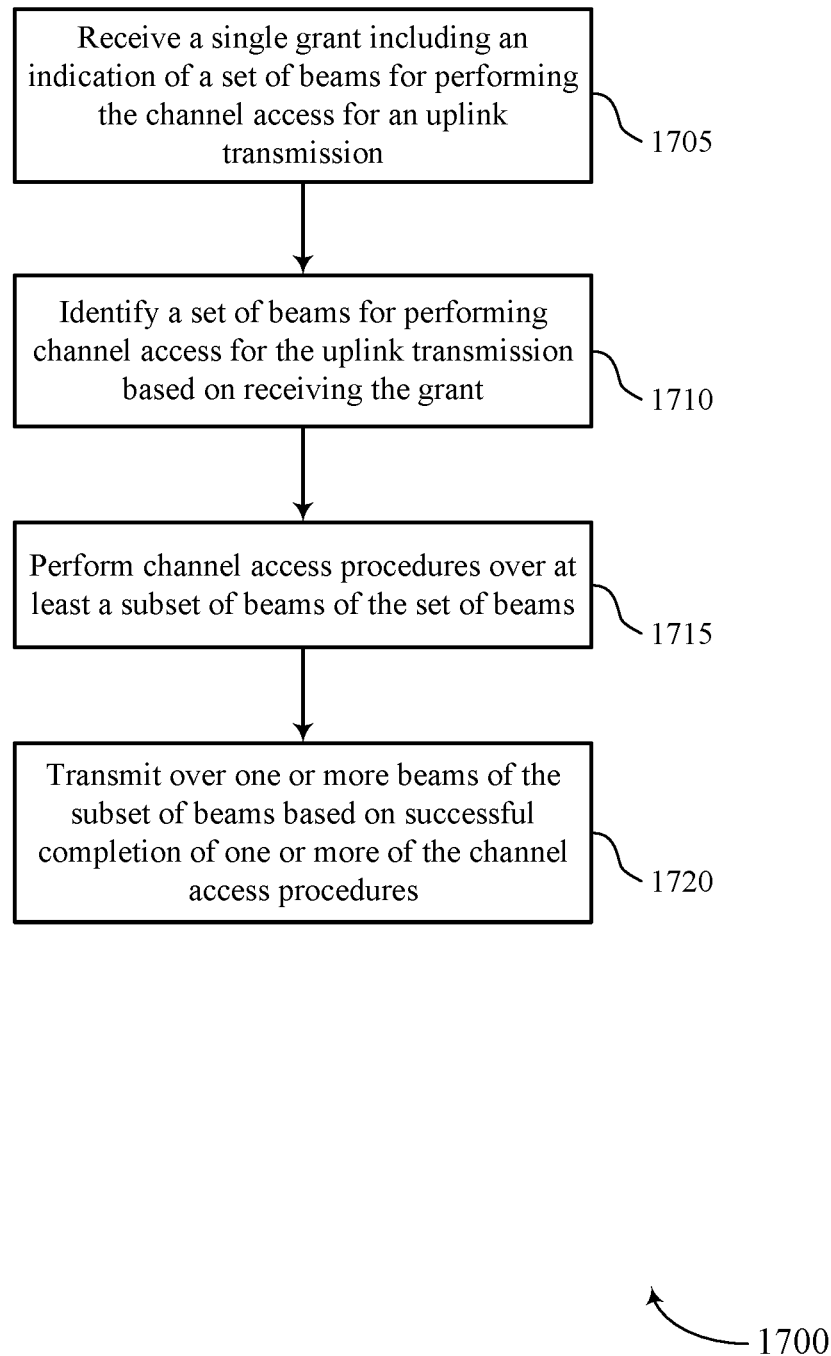

FIG. 17 shows a flowchart illustrating a method 1700 that supports uplink sensing with multiple beams in a shared spectrum in accordance with aspects of the present disclosure. The operations of method 1700 may be implemented by a wireless node (e.g., a UE 115 as described herein, an MT entity of IAB node in an IAB network) or its components as described herein. For example, the operations of method 1700 may be performed by a communications manager as described with reference to FIGS. 8 through 11. In some aspects, a UE may execute a set of instructions to control the functional elements of the UE to perform the functions described below. Additionally or alternatively, a UE may perform aspects of the functions described below using special-purpose hardware.

At 1705, the UE may receive a single grant including an indication of a set of beams for performing channel access for an uplink transmission. The operations of 1705 may be performed according to the methods described herein. In some aspects, aspects of the operations of 1705 may be performed by a grant component as described with reference to FIGS. 8 through 11.

At 1710, the UE may identify a set of beams for performing channel access for the uplink transmission based on receiving the grant. The operations of 1710 may be performed according to the methods described herein. In some aspects, aspects of the operations of 1710 may be performed by a beam component as described with reference to FIGS. 8 through 11.

At 1715, the UE may perform channel access procedures over at least a subset of beams of the set of beams. The operations of 1715 may be performed according to the methods described herein. In some aspects, aspects of the operations of 1715 may be performed by a channel access component as described with reference to FIGS. 8 through 11.

At 1720, the UE may transmit over one or more beams of the subset of beams based on successful completion of one or more of the channel access procedures. The operations of 1720 may be performed according to the methods described herein. In some aspects, aspects of the operations of 1720 may be performed by a beam component as described with reference to FIGS. 8 through 11.

Figure 18:
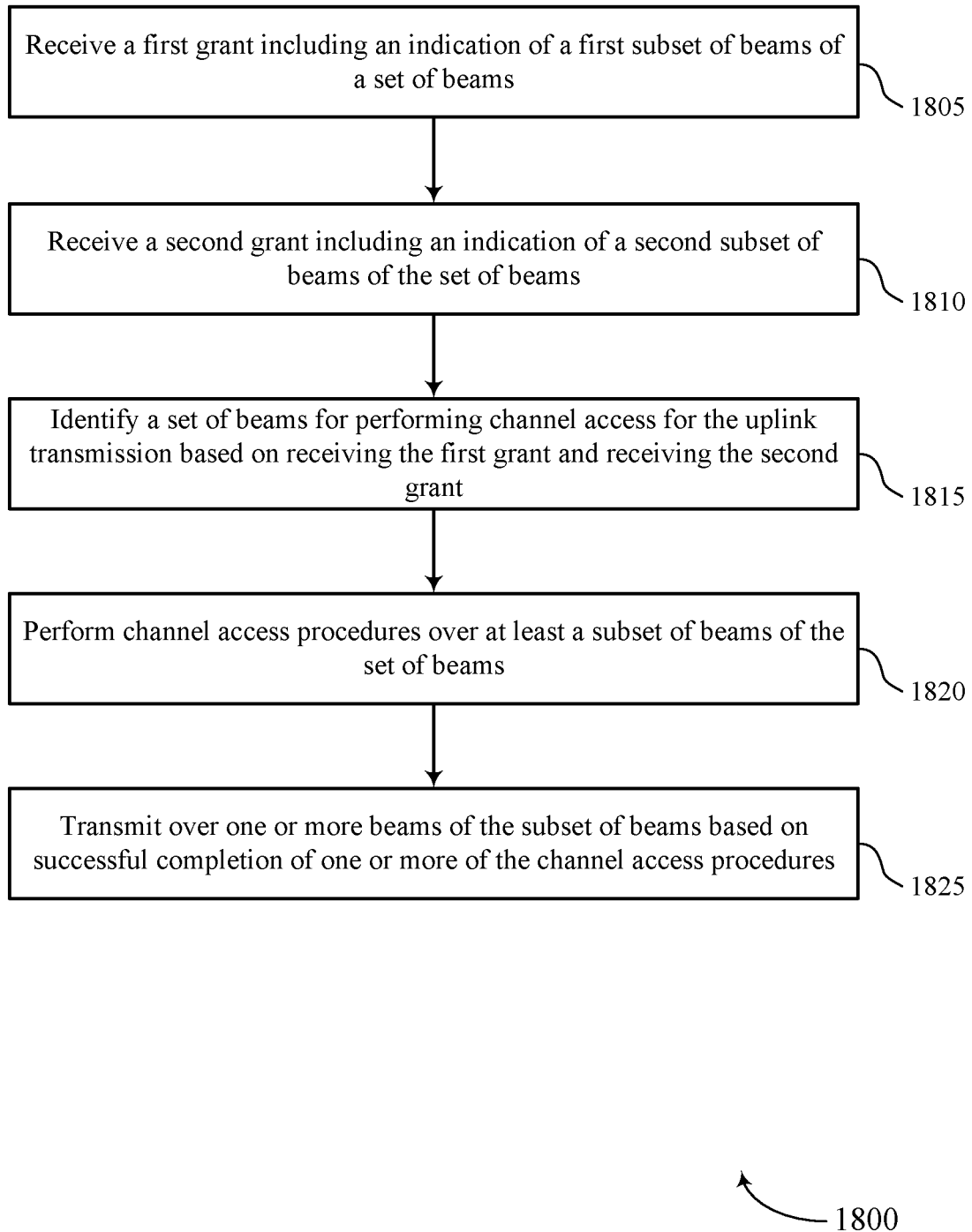

FIG. 18 shows a flowchart illustrating a method 1800 that supports uplink sensing with multiple beams in a shared spectrum in accordance with aspects of the present disclosure. The operations of method 1800 may be implemented by a wireless node (e.g., a UE 115 as described herein, an MT entity of IAB node in an IAB network) or its components as described herein. For example, the operations of method 1800 may be performed by a communications manager as described with reference to FIGS. 8 through 11. In some aspects, a UE may execute a set of instructions to control the functional elements of the UE to perform the functions described below. Additionally or alternatively, a UE may perform aspects of the functions described below using special-purpose hardware.

At 1805, the UE may receive a first grant including an indication of a first subset of beams of a set of beams. The operations of 1805 may be performed according to the methods described herein. In some aspects, aspects of the operations of 1805 may be performed by a grant component as described with reference to FIGS. 8 through 11.

At 1810, the UE may receive a second grant including an indication of a second subset of beams of the set of beams. The operations of 1810 may be performed according to the methods described herein. In some aspects, aspects of the operations of 1810 may be performed by a grant component as described with reference to FIGS. 8 through 11.

At 1815, the UE may identify a set of beams for performing channel access for the uplink transmission based on receiving the grant. The operations of 1815 may be performed according to the methods described herein. In some aspects, aspects of the operations of 1815 may be performed by a beam component as described with reference to FIGS. 8 through 11.

At 1820, the UE may perform channel access procedures over at least a subset of beams of the set of beams. The operations of 1820 may be performed according to the methods described herein. In some aspects, aspects of the operations of 1820 may be performed by a channel access component as described with reference to FIGS. 8 through 11.

At 1825, the UE may transmit over one or more beams of the subset of beams based on successful completion of one or more of the channel access procedures. The operations of 1825 may be performed according to the methods described herein. In some aspects, aspects of the operations of 1825 may be performed by a beam component as described with reference to FIGS. 8 through 11.

Figure 19:
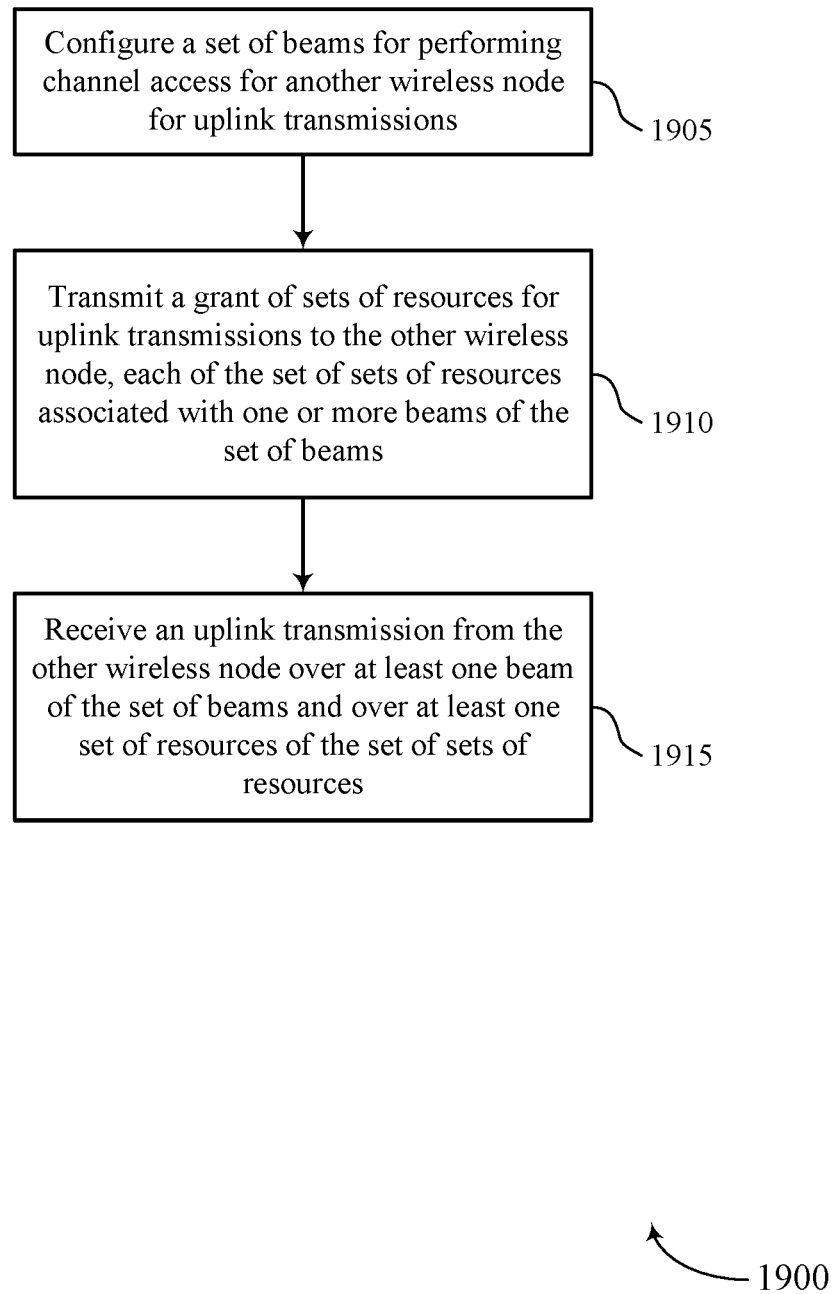

FIG. 19 shows a flowchart illustrating a method 1900 that supports uplink sensing with multiple beams in a shared spectrum in accordance with aspects of the present disclosure. The operations of method 1900 may be implemented by a wireless node (e.g., a base station 105, a DU of an IAB node in an IAB network, a CU of an IAB donor node in the IAB network) or its components as described herein. For example, the operations of method 1900 may be performed by a communications manager as described with reference to FIGS. 12 through 15. In some aspects, a base station may execute a set of instructions to control the functional elements of the base station to perform the functions described below. Additionally or alternatively, a base station may perform aspects of the functions described below using special-purpose hardware.

At 1905, the base station may configure a set of beams for performing channel access for another wireless node for uplink transmissions. The operations of 1905 may be performed according to the methods described herein. In some aspects, aspects of the operations of 1905 may be performed by a beam configuration component as described with reference to FIGS. 12 through 15.

At 1910, the base station may transmit a grant of sets of resources for uplink transmissions to the other wireless node, each of the set of sets of resources associated with one or more beams of the set of beams. The operations of 1910 may be performed according to the methods described herein. In some aspects, aspects of the operations of 1910 may be performed by a grant communication component as described with reference to FIGS. 12 through 15.

At 1915, the base station may receive an uplink transmission from the other wireless node over at least one beam of the set of beams and over at least one set of resources of the set of sets of resources. The operations of 1915 may be performed according to the methods described herein. In some aspects, aspects of the operations of 1915 may be performed by a beam communication component as described with reference to FIGS. 12 through 15.

Figure 20:
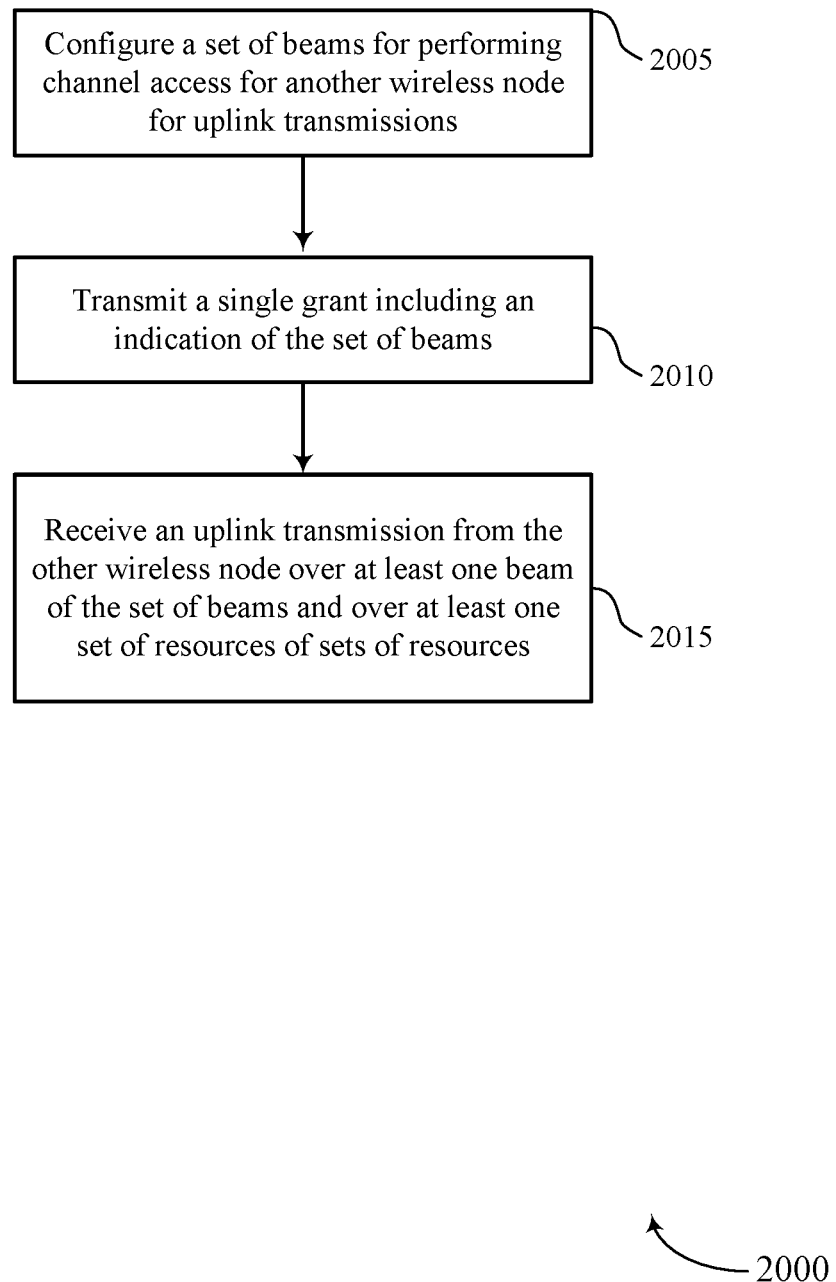

FIG. 20 shows a flowchart illustrating a method 2000 that supports uplink sensing with multiple beams in a shared spectrum in accordance with aspects of the present disclosure. The operations of method 2000 may be implemented by a wireless node (e.g., a base station 105, a DU of an IAB node in an IAB network, a CU of an IAB donor node in the IAB network) or its components as described herein. For example, the operations of method 2000 may be performed by a communications manager as described with reference to FIGS. 12 through 15. In some aspects, a base station may execute a set of instructions to control the functional elements of the base station to perform the functions described below. Additionally or alternatively, a base station may perform aspects of the functions described below using special-purpose hardware.

At 2005, the base station may configure a set of beams for performing channel access for another wireless node for uplink transmissions. The operations of 2005 may be performed according to the methods described herein. In some aspects, aspects of the operations of 2005 may be performed by a beam configuration component as described with reference to FIGS. 12 through 15.

At 2010, the base station may transmit a single grant including an indication of the set of beams. The operations of 2010 may be performed according to the methods described herein. In some aspects, aspects of the operations of 2010 may be performed by a grant communication component as described with reference to FIGS. 12 through 15.

At 2015, the base station may receive an uplink transmission from the other wireless node over at least one beam of the set of beams and over at least one set of resources of sets of resources. The operations of 2015 may be performed according to the methods described herein. In some aspects, aspects of the operations of 2015 may be performed by a beam communication component as described with reference to FIGS. 12 through 15.

At 2020, The operations of 2020 may be performed according to the methods described herein. In some aspects, aspects of the operations of 2020 may be performed by a grant communication component as described with reference to FIGS. 12 through 15.

Figure 21:
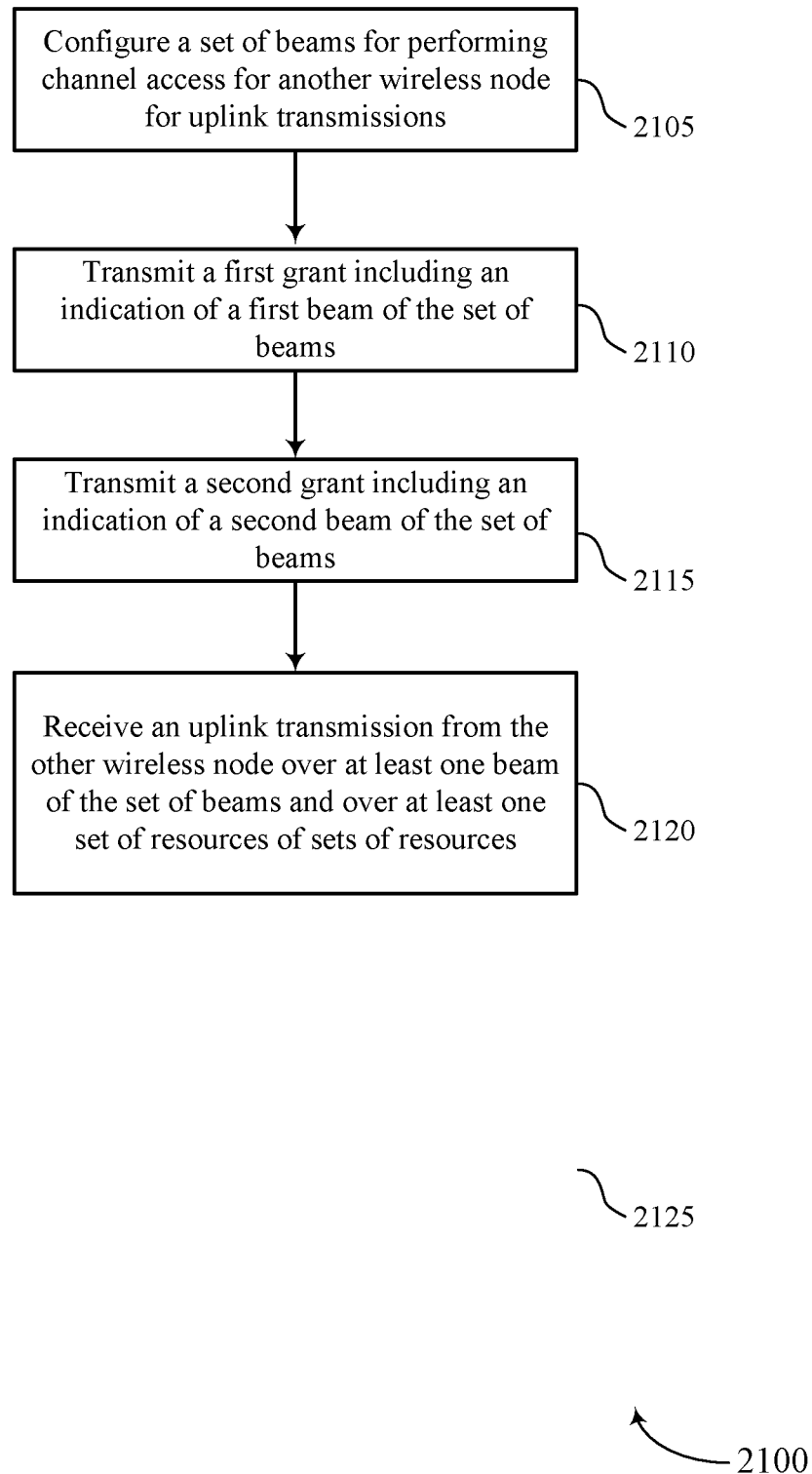

FIG. 21 shows a flowchart illustrating a method 2100 that supports uplink sensing with multiple beams in a shared spectrum in accordance with aspects of the present disclosure. The operations of method 2100 may be implemented by a wireless node (e.g., a base station 105, a DU of an IAB node in an IAB network, a CU of an IAB donor node in the IAB network) or its components as described herein. For example, the operations of method 2100 may be performed by a communications manager as described with reference to FIGS. 12 through 15. In some aspects, a base station may execute a set of instructions to control the functional elements of the base station to perform the functions described below. Additionally or alternatively, a base station may perform aspects of the functions described below using special-purpose hardware.

At 2105, the base station may configure a set of beams for performing channel access for another wireless node for uplink transmissions. The operations of 2105 may be performed according to the methods described herein. In some aspects, aspects of the operations of 2105 may be performed by a beam configuration component as described with reference to FIGS. 12 through 15.

At 2110, the base station may transmit a first grant including an indication of a first beam of the set of beams. The operations of 2110 may be performed according to the methods described herein. In some aspects, aspects of the operations of 2110 may be performed by a grant communication component as described with reference to FIGS. 12 through 15.

At 2115, the base station may transmit a second grant including an indication of a second beam of the set of beams. The operations of 2115 may be performed according to the methods described herein. In some aspects, aspects of the operations of 2115 may be performed by a grant communication component as described with reference to FIGS. 12 through 15.

At 2120, the base station may receive an uplink transmission from the other wireless node over at least one beam of the set of beams and over at least one set of resources of sets of resources. The operations of 2120 may be performed according to the methods described herein. In some aspects, aspects of the operations of 2120 may be performed by a beam communication component as described with reference to FIGS. 12 through 15.

The following provides an overview of aspects of the present disclosure:

Aspect 1: A method for wireless communication at a wireless node, comprising: receiving a grant of a set of resources for an uplink transmission, the grant indicating a plurality of beams for performing channel access for the uplink transmission; performing channel access procedures over at least a subset of beams of the plurality of beams; and transmitting over one or more beams of the subset of beams based at least in part on successful completion of one or more of the channel access procedures.

Aspect 2: The method of aspect 1, wherein receiving the grant comprises: receiving a single grant comprising an indication of the plurality of beams for performing the channel access for the uplink transmission.

Aspect 3: The method of any of aspects 1 through 2, wherein receiving the grant comprises: receiving a first grant comprising an indication of a first subset of beams of the plurality of beams; receiving a second grant comprising an indication of a second subset of beams of the plurality of beams, wherein identifying the plurality of beams for performing the channel access is based at least in part on the receiving the first grant and receiving the second grant.

Aspect 4: The method of any of aspects 1 through 3, further comprising: determining energy levels of beams of the subset of beams associated with the successfully completed one or more channel access procedures; and selecting the one or more beams of the subset of beams based at least in part on the determined energy levels of the beams of the subset of beams associated with the successfully completed one or more channel access procedures.

Aspect 5: The method of aspect 4, wherein selecting the one or more beams of the subset of beams comprises: selecting a beam of the subset of beams based at least in part on determining the energy level of the beam satisfies a threshold, wherein transmitting over the one or more beams of the subset of beams comprises transmitting over the beam.

Aspect 6: The method of any of aspects 4 through 5, wherein selecting the one or more beams of the subset of beams comprises: selecting two or more beams of the subset of beams based at least in part determining the respective energy levels of the two or more beams satisfy a threshold, wherein transmitting over the one or more beams of the subset of beams comprises transmitting over the two or more beams.

Aspect 7: The method of any of aspects 4 through 6, wherein selecting the one or more beams of the subset of beams comprises: selecting a predetermined quantity of beams of the subset of beams based at least in part on determining the respective energy levels of the predetermined quantity of beams have a lowest energy level among the beams of the subset of beams associated with the successfully completed one or more channel access procedures, wherein transmitting over the one or more beams of the subset of beams comprises transmitting over the predetermined quantity of beams.

Aspect 8: The method of any of aspects 1 through 7, wherein receiving the grant comprises: receiving an indication of a maximum quantity of beams over which the wireless node is permitted to transmit, wherein transmitting over the one or more beams of the subset of beams is based at least in part on receiving the indication of the maximum quantity of beams.

Aspect 9: The method of any of aspects 1 through 8, further comprising: transmitting a message comprising an indication of a capability of the wireless node associated with the channel access procedures, wherein identifying the plurality of beams for performing the channel access for the uplink transmission, performing the channel access procedures over at least the subset of beams, or both, is based at least in part on the capability.

Aspect 10: The method of any of aspects 1 through 9, wherein receiving the grant of the set of resources for the uplink transmission comprises: receiving one or more resource allocations for the uplink transmission, wherein each of the one or more resource allocations for the uplink transmission is associated with a beam of the subset of beams over which the channel access procedures are performed, wherein transmitting over the one or more beams of the subset of beams based at least in part on successful completion of one or more of the channel access procedures comprises determining the one or more resource allocations for the uplink transmission based at least in part on successful completion of the one or more of the channel access procedures over the subset of beams over which the channel access procedures are performed.

Aspect 11: The method of aspect 10, wherein the one or more resource allocations for the uplink transmission comprise a first resource allocation for a first uplink transmission, wherein the first resource allocation is associated with a first subset of beams of the subset of beams over which the channel access procedures are performed and a first subset of resources; a second resource allocation for a second uplink transmission, wherein the second resource allocation is associated with a second subset of beams of the subset of beams over which the channel access procedures are performed and a second subset of resources, wherein the first subset of resources are fully-overlapping, at least partially overlapping, or non-overlapping with the second subset of resources.

Aspect 12: The method of any of aspects 1 through 11, wherein performing the channel access procedures over at least the subset of beams of the plurality of beams comprises: performing a first channel access procedure over a first beam of the subset of beams over a first time period; and performing a second channel access procedure over a second beam of the subset of beams over the first time period or a second time period.

Aspect 13: The method of any of aspects 1 through 12, further comprising: determining that a first channel access procedure over a first beam of the subset of beams is successful; and terminating the channel access procedures over remaining beams of the plurality of beams based at least in part on transmitting over the one or more beams of the subset of beams.

Aspect 14: The method of any of aspects 1 through 13, wherein the channel access procedures are of a first type of channel access procedure, the method further comprising: determining that a first channel access procedure over a first beam of the subset of beams is successful; and continuing to perform the channel access procedures of the first type for remaining beams of the subset of beams.

Aspect 15: The method of aspect 14, further comprising: determining that a first quantity of the channel access procedures are successful; and transmitting over a second quantity of the subset of beams based at least in part on respective energy levels of the subset of beams.

Aspect 16: The method of any of aspects 1 through 15, wherein the channel access procedures are of a first type of channel access procedure, the method further comprising: determining that a first channel access procedure over a first beam of the subset of beams is successful; and switching a type of the channel access procedures for remaining beams of the subset of beams to a second type channel access procedure based at least in part on the determining that the first channel access procedure is successful.

Aspect 17: The method of aspect 16, further comprising: determining that a first quantity of the channel access procedures for the first beam and the remaining beams are successful; and transmitting over a second quantity of the subset of beams based at least in part on respective energy levels of the subset of beams, a beam correspondence between the remaining beams and the first beam, a transmit power for the remaining beams, or a combination thereof.

Aspect 18: The method of any of aspects 1 through 17, further comprising: inserting a filler signal based at least in part on the successful completion of one or more of the channel access procedures, wherein transmitting over the one or more beams of the subset of beams is based at least in part on inserting the filler signal.

Aspect 19: The method of aspect 18, wherein inserting the filler signal comprises: inserting an extended cyclic prefix based at least in part on the successful completion of one or more of the channel access procedures, wherein transmitting over the one or more beams of the subset of beams is based at least in part on inserting the extended cyclic prefix.

Aspect 20: The method of any of aspects 1 through 19, wherein receiving the grant comprises: receiving a DCI message comprising an indication of the plurality of beams for performing the channel access for the uplink transmission.

Aspect 21: The method of any of aspects 1 through 20, further comprising: receiving a medium access control (MAC) control element (MAC-CE) comprising an indication of the plurality of beams for performing the channel access for the uplink transmission.

Aspect 22: The method of any of aspects 1 through 21, further comprising: receiving an RRC message comprising an indication of the plurality of beams for performing the channel access for the uplink transmission.

Aspect 23: The method of any of aspects 1 through 22, wherein the wireless node comprises a UE in an access network or a mobile terminal (MT) entity of an integrated access and backhaul node (IAB node) in an IAB network.

Aspect 24: A method for wireless communication at a wireless node, comprising: configuring a plurality of beams for performing channel access for another wireless node for uplink transmissions; transmitting a grant of a plurality of sets of resources for uplink transmissions to the other wireless node, each of the plurality of sets of resources associated with one or more beams of the plurality of beams; and receiving an uplink transmission from the other wireless node over at least one beam of the plurality of beams and over at least one set of resources of the plurality of sets of resources.

Aspect 25: The method of aspect 24, wherein transmitting the grant comprises: transmitting a single grant comprising an indication of the plurality of beams.

Aspect 26: The method of any of aspects 24 through 25, wherein transmitting the grant comprises: transmitting a first grant comprising an indication of a first beam of the plurality of beams; and transmitting a second grant comprising an indication of a second beam of the plurality of beams.

Aspect 27: The method of any of aspects 24 through 26, wherein transmitting the grant comprises: transmitting an indication of a maximum quantity of beams over which the other wireless node is permitted to transmit, wherein receiving over the at least one beam of the plurality of beams is based at least in part on transmitting the indication of the maximum quantity of beams.

Aspect 28: The method of any of aspects 24 through 27, further comprising: receiving a message comprising an indication of a capability of the other wireless node associated with channel access procedures, wherein configuring the plurality of beams, transmitting the grant of the plurality of sets of resources, receiving over the one or more beams, or a combination thereof, is based at least in part on the capability.

Aspect 29: The method of any of aspects 24 through 28, wherein transmitting the grant comprises: transmitting one or more resource allocations for the uplink transmission, wherein each of the one or more resource allocations for the uplink transmission is associated with a beam of a subset of beams over which channel access procedures are performed by the other wireless node, wherein receiving over the one or more beams is based at least in part on the one or more resource allocations.

Aspect 30: The method of aspect 29, wherein the one or more resource allocations for the uplink transmission comprise a first resource allocation for a first uplink transmission, wherein the first resource allocation is associated with a first subset of beams of the subset of beams over which the channel access procedures are performed by the other wireless node and a first subset of resources; a second resource allocation for a second uplink transmission, wherein the second resource allocation is associated with a second subset of beams of the subset of beams over which the channel access procedures are performed by the other wireless node and a second subset of resources, wherein the first subset of resources are fully-overlapping, at least partially overlapping, or non-overlapping with the second subset of resources.

Aspect 31: The method of any of aspects 24 through 30, wherein transmitting the grant comprises: transmitting an indication for inserting a filler signal based at least in part on the successful completion of one or more of the channel access procedures, wherein receiving over the at least one beam is based at least in part on an insertion of the filler signal by the other wireless node.

Aspect 32: The method of aspect 31, wherein transmitting the indication for inserting the filler signal comprises: transmitting an indication for inserting an extended cyclic prefix based at least in part on the successful completion of one or more of the channel access procedures, wherein receiving over the at least one beam is based at least in part on an insertion of the extended cyclic prefix by the other wireless node.

Aspect 33: The method of any of aspects 24 through 32, further comprising: monitoring the plurality of sets of resources, wherein receiving over the one or more beams of the plurality of beams is based at least in part on monitoring the plurality of sets of resources.

Aspect 34: The method of any of aspects 24 through 33, wherein transmitting the grant comprises: transmitting a DCI message comprising an indication of the plurality of beams for performing the channel access for the uplink transmission.

Aspect 35: The method of any of aspects 24 through 34, further comprising: transmitting a medium access control (MAC) control element (MAC-CE) comprising an indication of the plurality of beams for performing the channel access for the uplink transmission.

Aspect 36: The method of any of aspects 24 through 35, further comprising: transmitting an RRC message comprising an indication of the plurality of beams for performing the channel access for the uplink transmission.

Aspect 37: The method of any of aspects 24 through 36, wherein the wireless node comprises a base station in an access network, a distributed node (DU) of an integrated access and backhaul node (IAB node) in a IAB network, or a central unit (CU) of an IAB donor node in the IAB network.

Aspect 38: An apparatus for wireless communication at a wireless node, comprising a processor; memory coupled with the processor; and instructions stored in the memory and executable by the processor to cause the apparatus to perform a method of any of aspects 1 through 23.

Aspect 39: An apparatus for wireless communication at a wireless node, comprising at least one means for performing a method of any of aspects 1 through 23.

Aspect 40: A non-transitory computer-readable medium storing code for wireless communication at a wireless node, the code comprising instructions executable by a processor to perform a method of any of aspects 1 through 23.

Aspect 41: An apparatus for wireless communication at a wireless node, comprising a processor; memory coupled with the processor; and instructions stored in the memory and executable by the processor to cause the apparatus to perform a method of any of aspects 24 through 37.

Aspect 42: An apparatus for wireless communication at a wireless node, comprising at least one means for performing a method of any of aspects 24 through 37.

Aspect 43: A non-transitory computer-readable medium storing code for wireless communication at a wireless node, the code comprising instructions executable by a processor to perform a method of any of aspects 24 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication implemented by a wireless node, comprising:
   one or more memories storing processor-executable code; and
   one or more processors coupled with the one or more memories and operable to execute the code to cause the one or more processors to:
      receive a grant of a set of resources for an uplink transmission, the grant indicating a plurality of beams for performing channel access to initiate a channel occupancy time for a channel in a shared spectrum for the uplink transmission;
      perform channel access procedures over at least a subset of beams of the plurality of beams, wherein performance of the channel access procedures comprises performance of channel sensing procedures prior to gaining access to the channel to initiate the channel occupancy time; and transmit over one or more beams of the subset of beams and over the channel based at least in part on successful completion of one or more of the channel access procedures.

2. The apparatus of claim 1, wherein the code to receive the grant is executable by the one or more processors to cause the apparatus to:
receive a single grant comprising an indication of the plurality of beams for performing the channel access for the uplink transmission.

3. The apparatus of claim 1, wherein the code to receive the grant is executable by the one or more processors to cause the apparatus to:
receive a first grant comprising an indication of a first subset of beams of the plurality of beams; and
receive a second grant comprising an indication of a second subset of beams of the plurality of beams, wherein identification of the plurality of beams for performance of the channel access is based at least in part on the reception of the first grant and the reception of the second grant.

4. The apparatus of claim 1, wherein the code are further executable by the one or more processors to cause the apparatus to:
determine energy levels of beams of the subset of beams associated with the successfully completed one or more channel access procedures; and
select the one or more beams of the subset of beams based at least in part on the determined energy levels of the beams of the subset of beams associated with the successfully completed one or more channel access procedures.

5. The apparatus of claim 1, wherein the code to receive the grant is executable by the one or more processors to cause the apparatus to:
receive an indication of a maximum quantity of beams over which the wireless node is permitted to transmit, wherein transmitting over the one or more beams of the subset of beams is based at least in part on receiving the indication of the maximum quantity of beams.

6. The apparatus of claim 1, wherein the code are further executable by the one or more processors to cause the apparatus to:
transmit a message comprising an indication of a capability of the wireless node associated with the channel access procedures, wherein identification of the plurality of beams for performance of the channel access for the uplink transmission, performance of the channel access procedures over at least the subset of beams, or both, is based at least in part on the capability.

7. The apparatus of claim 1, wherein the code to receive the grant of the set of resources for the uplink transmission is executable by the one or more processors to cause the apparatus to:
receive one or more resource allocations for the uplink transmission, wherein each of the one or more resource allocations for the uplink transmission is associated with a beam of the subset of beams over which the channel access procedures are performed, wherein transmission over the one or more beams of the subset of beams based at least in part on the successful completion of one or more of the channel access procedures comprises determination of the one or more resource allocations for the uplink transmission based at least in part on the successful completion of the one or more of the channel access procedures over the subset of beams over which the channel access procedures are performed.

8. The apparatus of claim 7, wherein the one or more resource allocations for the uplink transmission comprise:
a first resource allocation for a first uplink transmission, wherein the first resource allocation is associated with a first subset of beams of the subset of beams over which the channel access procedures are performed and a first subset of resources; and
a second resource allocation for a second uplink transmission, wherein the second resource allocation is associated with a second subset of beams of the subset of beams over which the channel access procedures are performed and a second subset of resources, wherein the first subset of resources are fully-overlapping, at least partially overlapping, or non-overlapping with the second subset of resources.

9. The apparatus of claim 1, wherein the code to perform the channel access procedures over at least the subset of beams of the plurality of beams is executable by the one or more processors to cause the apparatus to:
perform a first channel access procedure over a first beam of the subset of beams over a first time period; and
perform a second channel access procedure over a second beam of the subset of beams over the first time period or a second time period.

10. The apparatus of claim 1, wherein the code are further executable by the one or more processors to cause the apparatus to:
determine that a first channel access procedure over a first beam of the subset of beams is successful; and
terminate the channel access procedures over remaining beams of the plurality of beams based at least in part on transmission over the one or more beams of the subset of beams.

11. The apparatus of claim 1, wherein the channel access procedures are of a first type of channel access procedure, and the code are further executable by the one or more processors to cause the apparatus to:
determine that a first channel access procedure over a first beam of the subset of beams is successful; and
continue to perform the channel access procedures of the first type for remaining beams of the subset of beams.

12. An apparatus for wireless communication implemented by a wireless node, comprising:
one or more memories storing processor-executable code; and
one or more processors coupled with the one or more memories and operable to execute the code to cause the one or more processors to:
configure a plurality of beams for performance of channel access to initiate a channel occupancy time for a channel in a shared spectrum for another wireless node for uplink transmissions, wherein performance of the channel access comprises performance of a channel sensing procedure prior to gaining access to the channel to initiate the channel occupancy time;
transmit a grant of a plurality of sets of resources for uplink transmissions to the other wireless node, wherein the grant indicates the plurality of beams, and wherein each of the plurality of sets of resources is associated with one or more beams of the plurality of beams; and
receive, over the channel, an uplink transmission from the other wireless node over at least one beam of the plurality of beams and over at least one set of resources of the plurality of sets of resources.

13. The apparatus of claim 12, wherein the code to transmit the grant is executable by the one or more processors to cause the apparatus to:
transmit a single grant comprising an indication of the plurality of beams.

14. The apparatus of claim 12, wherein the code to transmit the grant is executable by the one or more processors to cause the apparatus to:
transmit a first grant comprising an indication of a first beam of the plurality of beams; and
transmit a second grant comprising an indication of a second beam of the plurality of beams.

15. The apparatus of claim 12, wherein the code to transmit the grant is executable by the one or more processors to cause the apparatus to:
transmit an indication of a maximum quantity of beams over which the other wireless node is permitted to transmit, wherein reception over the at least one beam of the plurality of beams is based at least in part on transmission of the indication of the maximum quantity of beams.

16. A method for wireless communication implemented by a wireless node, comprising:
receiving a grant of a set of resources for an uplink transmission, the grant indicating a plurality of beams for performing channel access to initiate a channel occupancy time for a channel in a shared spectrum for the uplink transmission;
performing channel access procedures over at least a subset of beams of the plurality of beams, wherein performing the channel access procedures comprises performing channel sensing procedures prior to gaining access to the channel to initiate the channel occupancy time; and
transmitting over one or more beams of the subset of beams and over the channel based at least in part on successful completion of one or more of the channel access procedures.

17. The method of claim 16, wherein receiving the grant comprises:
receiving a single grant comprising an indication of the plurality of beams for performing the channel access for the uplink transmission.

18. The method of claim 16, wherein receiving the grant comprises:
receiving a first grant comprising an indication of a first subset of beams of the plurality of beams; and
receiving a second grant comprising an indication of a second subset of beams of the plurality of beams, wherein identifying the plurality of beams for performing the channel access is based at least in part on the receiving the first grant and receiving the second grant.

19. The method of claim 16, further comprising:
determining energy levels of beams of the subset of beams associated with the successfully completed one or more channel access procedures; and
selecting the one or more beams of the subset of beams based at least in part on the determined energy levels of the beams of the subset of beams associated with the successfully completed one or more channel access procedures.

20. The method of claim 16, wherein receiving the grant comprises:
receiving an indication of a maximum quantity of beams over which the wireless node is permitted to transmit, wherein transmitting over the one or more beams of the subset of beams is based at least in part on receiving the indication of the maximum quantity of beams.

21. The method of claim 16, further comprising:
transmitting a message comprising an indication of a capability of the wireless node associated with the channel access procedures, wherein identifying the plurality of beams for performing the channel access for the uplink transmission, performing the channel access procedures over at least the subset of beams, or both, is based at least in part on the capability.

22. The method of claim 16, wherein receiving the grant of the set of resources for the uplink transmission comprises:
receiving one or more resource allocations for the uplink transmission, wherein each of the one or more resource allocations for the uplink transmission is associated with a beam of the subset of beams over which the channel access procedures are performed, wherein transmitting over the one or more beams of the subset of beams based at least in part on successful completion of one or more of the channel access procedures comprises determining the one or more resource allocations for the uplink transmission based at least in part on successful completion of the one or more of the channel access procedures over the subset of beams over which the channel access procedures are performed.

23. The method of claim 22, wherein the one or more resource allocations for the uplink transmission comprise:
a first resource allocation for a first uplink transmission, wherein the first resource allocation is associated with a first subset of beams of the subset of beams over which the channel access procedures are performed and a first subset of resources; and
a second resource allocation for a second uplink transmission, wherein the second resource allocation is associated with a second subset of beams of the subset of beams over which the channel access procedures are performed and a second subset of resources, wherein the first subset of resources are fully-overlapping, at least partially overlapping, or non-overlapping with the second subset of resources.

24. The method of claim 16, wherein performing the channel access procedures over at least the subset of beams of the plurality of beams comprises:
performing a first channel access procedure over a first beam of the subset of beams over a first time period; and
performing a second channel access procedure over a second beam of the subset of beams over the first time period or a second time period.

25. The method of claim 16, further comprising:
determining that a first channel access procedure over a first beam of the subset of beams is successful; and
terminating the channel access procedures over remaining beams of the plurality of beams based at least in part on transmitting over the one or more beams of the subset of beams.

26. The method of claim 16, wherein the channel access procedures are of a first type of channel access procedure, the method further comprising:
determining that a first channel access procedure over a first beam of the subset of beams is successful; and
continuing to perform the channel access procedures of the first type for remaining beams of the subset of beams.

27. A method for wireless communication implemented by a wireless node, comprising:
- configuring a plurality of beams for performing channel access to initiate a channel occupancy time for a channel in a shared spectrum for another wireless node for uplink transmissions, wherein performing the channel access comprises performing a channel sensing procedure prior to gaining access to the channel to initiate the channel occupancy time;
- transmitting a grant of a plurality of sets of resources for uplink transmissions to the other wireless node, wherein the grant indicates the plurality of beams, and wherein each of the plurality of sets of resources is associated with one or more beams of the plurality of beams; and
- receiving, over the channel, an uplink transmission from the other wireless node over at least one beam of the plurality of beams and over at least one set of resources of the plurality of sets of resources.

28. The method of claim 27, wherein transmitting the grant comprises:
- transmitting a single grant comprising an indication of the plurality of beams.

29. The method of claim 27, wherein transmitting the grant comprises:
- transmitting a first grant comprising an indication of a first beam of the plurality of beams; and
- transmitting a second grant comprising an indication of a second beam of the plurality of beams.

30. The method of claim 27, wherein transmitting the grant comprises:
- transmitting an indication of an indication of a maximum quantity of beams over which the other wireless node is permitted to transmit, wherein receiving over the at least one beam of the plurality of beams is based at least in part on transmitting the indication of the maximum quantity of beams.

* * * * *